United States Patent
Wang et al.

(10) Patent No.: US 12,487,271 B2
(45) Date of Patent: Dec. 2, 2025

(54) INSULATION SAMPLING CIRCUIT AND CONTROL METHOD THEREFOR, VOLTAGE WITHSTAND TEST METHOD, AND POWER CONSUMING DEVICE

(71) Applicant: CONTEMPORARY AMPEREX TECHNOLOGY (HONG KONG) LIMITED, Hong Kong (CN)

(72) Inventors: Xingchang Wang, Ningde (CN); Wei Tian, Ningde (CN); Zhiwei Yan, Ningde (CN); Hang Ma, Ningde (CN); Fangyou Lu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 203 days.

(21) Appl. No.: 18/528,404

(22) Filed: Dec. 4, 2023

(65) Prior Publication Data
US 2024/0110965 A1 Apr. 4, 2024

Related U.S. Application Data

(63) Continuation of application No. PCT/CN2022/121858, filed on Sep. 27, 2022.

(30) Foreign Application Priority Data

Nov. 5, 2021 (CN) .......................... 202111306494.2

(51) Int. Cl.
*G01R 31/14* (2006.01)
*G01R 31/00* (2006.01)

(52) U.S. Cl.
CPC ............ *G01R 31/14* (2013.01); *G01R 31/007* (2013.01)

(58) Field of Classification Search
CPC ..... G01R 27/025; G01R 31/007; G01R 31/14
See application file for complete search history.

(56) References Cited

U.S. PATENT DOCUMENTS

| | | | |
|---|---|---|---|
| 2019/0064279 A1 | 2/2019 | Dan et al. | |
| 2022/0291294 A1* | 9/2022 | Tseng | ..................... G01R 27/18 |
| 2023/0048778 A1* | 2/2023 | Mochizuki | ......... G01R 27/2605 |

FOREIGN PATENT DOCUMENTS

| | | |
|---|---|---|
| CN | 1489694 A | 4/2004 |
| CN | 106940420 A | 7/2017 |

(Continued)

OTHER PUBLICATIONS

The European Patent Office (EPO) The Extended European Search Report for Application No. 22889028.1 Aug. 20, 2024 7 Pages.

(Continued)

*Primary Examiner* — Neel D Shah
*Assistant Examiner* — Adam S Clarke
(74) *Attorney, Agent, or Firm* — ANOVA LAW GROUP, PLLC

(57) ABSTRACT

The present application discloses an insulation sampling circuit. The insulation sampling circuit includes: a first sampling circuit composed of a first sampling module, a first resistor, and a first switch module; a second sampling circuit composed of a second sampling module, a second resistor, and a second switch module; and a voltage withstand module. The first resistor is connected in parallel to the first sampling module; the first switch module is configured to control the first sampling module and/or the first resistor to be connected between a positive bus and a ground wire; the second resistor is connected in parallel to the second sampling module; the second switch module is configured to control the second sampling module and/or the second resistor to be connected between a negative bus and the (Continued)

ground wire; and the voltage withstand module is disposed on the ground wire to disconnect the ground wire.

13 Claims, 17 Drawing Sheets

(56) References Cited

FOREIGN PATENT DOCUMENTS

| CN | 107728066 A | 2/2018 |
|---|---|---|
| CN | 108333429 A | 7/2018 |
| CN | 108646187 A | 10/2018 |
| CN | 208239523 U | 12/2018 |
| CN | 109521277 A | 3/2019 |
| CN | 110389289 A | 10/2019 |
| CN | 110568372 A | 12/2019 |
| CN | 111157797 A | 5/2020 |
| CN | 111505380 A | 8/2020 |
| CN | 111596139 A | 8/2020 |
| CN | 111812474 A | 10/2020 |
| CN | 112311328 A | 2/2021 |
| CN | 112666431 A | 4/2021 |
| CN | 113376435 A | 9/2021 |
| CN | 113495202 A | 10/2021 |
| EP | 3617719 A1 | 3/2020 |
| JP | 2015509605 A | 3/2015 |
| JP | 2017075929 A | 4/2017 |

OTHER PUBLICATIONS

The World Intellectual Property Organization (WIPO) International Search Report and written opinion for PCT/CN2022/121858 Dec. 16, 2022 18 pages (including English translation).

The Japan Patent Office (JPO) Notice of Refusal for Application No. 2024-501263 Jan. 7, 2025 16 Pages (including translation).

State Intellectual Property Office of China Notice of Grant of Invention Patent Right for Application No. 202111306494.2 Sep. 5, 2025 8 pages (including translation).

* cited by examiner

INSULATION SAMPLING CIRCUIT AND CONTROL METHOD THEREFOR, VOLTAGE WITHSTAND TEST METHOD, AND POWER CONSUMING DEVICE

CROSS-REFERENCE TO RELATED APPLICATIONS

The present application claims priority to PCT Application No. PCT/CN2022/121858, filed on Sep. 27, 2022, which claims priority to Chinese Patent Application No. 202111306494.2, entitled "INSULATION SAMPLING CIRCUIT AND CONTROL METHOD THEREFOR, VOLTAGE WITHSTAND TEST METHOD, AND POWER CONSUMING DEVICE", filed on Nov. 5, 2021, which is incorporated herein by reference in its entirety.

TECHNICAL FIELD

The present application relates to the field of insulation tests, and in particular to an insulation sampling circuit and a control method therefor, a voltage withstand test method, and a power consuming device.

BACKGROUND ART

Insulation testing is a method used in various scenarios such as electric vehicles, hybrid electric vehicles, and charging piles to measure insulation resistances between high-voltage positive electrodes and ground and between high-voltage negative electrodes and ground, so as to determine the insulation performance. It is used to ensure electrical safety to prevent high voltages from causing direct damage to human bodies. However, existing insulation test circuits cannot solve the problem of a limited voltage withstand capacity of sampling circuits.

SUMMARY OF THE INVENTION

In view of the above problem, the present application provides an insulation sampling circuit and a control method therefor, a voltage withstand test method, and a power consuming device, which can solve the problem of a limited voltage withstand capacity of a sampling circuit which performs an insulation test.

In a first aspect, the present application provides an insulation sampling circuit. The insulation sampling circuit includes: a first sampling circuit, a second sampling circuit, and a voltage withstand module. The first sampling circuit includes: a first sampling module, a first resistor, and a first switch module, where the first resistor is connected in parallel to the first sampling module, and the first switch module is configured to control the first sampling module and/or the first resistor to be connected between a positive bus and a ground wire. The second sampling circuit includes: a second sampling module, a second resistor, and a second switch module, where the second resistor is connected in parallel to the second sampling module, and the second switch module is configured to control the second sampling module and/or the second resistor to be connected between a negative bus and the ground wire. The voltage withstand module is disposed on the ground wire and configured to disconnect the ground wire.

In the technical solution of the embodiments of the present application, the voltage withstand module capable of keeping the ground wire disconnected is added on the ground wire, such that the voltage withstand capacity between the positive bus and the ground wire/between the negative bus and the ground wire can be effectively improved to meet the need of a voltage withstand test for a higher voltage. Moreover, disposing the voltage withstand module on the ground wire also facilitates detecting an actual operating state of the voltage withstand module, thus simultaneously meeting different test requirements.

In some embodiments, the first switch module includes: a first switch and a third switch; and the second switch module includes: a second switch and a fourth switch. One end of the first resistor is connected to the positive bus, and the other end of the first resistor is connected to the ground wire through the first switch; one end of the first sampling module is connected to the positive bus, and the other end of the first sampling module is connected to the ground wire through the third switch; one end of the second resistor is connected to the positive bus, and the other end of the second resistor is connected to the ground wire through the second switch; and one end of the second sampling module is connected to the positive bus, and the other end of the second sampling module is connected to the ground wire through the fourth switch. The switch modules in the embodiments of the present application each include two switches, which are respectively configured to independently control the connection or disconnection of the sampling modules and of the known resistors, so as to implement different detection steps.

In some embodiments, the first sampling module includes: a third resistor and a fifth resistor; and the second sampling module includes: a fourth resistor and a sixth resistor. One end of the third resistor is connected to the positive bus, the other end of the third resistor is connected to one end of the fifth resistor, the other end of the fifth resistor is connected to the ground wire through the third switch, and a connection node between the third resistor and the fifth resistor forms a first voltage sampling point; and one end of the fourth resistor is connected to the negative bus, the other end of the fourth resistor is connected to one end of the sixth resistor, the other end of the sixth resistor is connected to the ground wire through the fourth switch, and a connection node between the fourth resistor and the sixth resistor forms a second voltage sampling point. The embodiment of the present application provides the sampling module composed of two resistors connected in series, such that the need of actual application can be met conveniently by adjusting resistances of the resistors.

In some embodiments, the voltage withstand module includes: a controllable switch disposed on the ground wire. In such a design, the ground wire can be disconnected when needed, such that the better voltage withstand capacity is provided to meet the need of a voltage withstand test, and the ground wire can also be reconnected after the end of the voltage withstand test to meet the requirements of an insulation test.

In a second aspect, the present application provides a voltage withstand test method. The voltage withstand test method is applied to the insulation sampling circuit as described above. The voltage withstand test method may include: applying a preset voltage between a positive bus and a ground wire that are connected to the insulation sampling circuit, and applying a preset voltage between a negative bus and the ground wire that are connected to the insulation sampling circuit, where a voltage withstand module of the insulation sampling circuit keeps the ground wire disconnected.

In the technical solution of the embodiments of the present application, in addition to the switch modules, the voltage withstand module for disconnecting the ground wire is also disposed between the positive bus and the ground wire/between the negative bus and the ground wire. Thus, the insulation sampling circuit has a better voltage withstand capacity and can complete a voltage withstand test for a higher voltage.

In a third aspect, the present application provides a control method for the insulation sampling circuit as described above. The control method includes: controlling a voltage withstand module of the insulation sampling circuit to be connected to a ground wire, controlling a first switch module of the insulation sampling circuit to enable a first sampling module to be connected between a positive bus and the ground wire, and controlling a second switch module to enable a second sampling module to be connected between a negative bus and the ground wire; obtaining a second sampling voltage formed by the second sampling module; determining whether the ground wire is connected based on a change trend of the second sampling voltage; performing an insulation test when the ground wire is connected; and outputting fault information when the ground wire is disconnected.

In the technical solution of the embodiments of the present application, whether the ground wire has been connected is detected and determined based on the change trend of the detected sampling voltage, such that a fault or failure in the voltage withstand module can be detected and identified, thereby improving the reliability of an insulation test result.

In some embodiments, the determining whether the ground wire is connected based on a change trend of the second sampling voltage specifically includes: obtaining a time that has elapsed from the time at which the voltage withstand module is connected to the ground wire to the time at which the second sampling voltage reaches a steady state; and determining whether the elapsed time meets a preset time threshold, and if the elapsed time meets the preset time threshold, determining that the ground wire is connected. In such a design, a process of charging a capacitor (which may be, for example, a capacitor located on a vehicle body of a new energy vehicle on which a high-voltage battery system is mounted) that normally exists when the ground wire is connected is used to detect whether the voltage withstand module has been normally connected to the ground wire, such that the accuracy of the insulation test result can be ensured.

In some embodiments, before controlling the voltage withstand module to be connected to the ground wire, the method further includes: enabling a first sampling module and a first resistor of the insulation sampling circuit to be connected between a positive bus and a ground wire, and enabling a second sampling module and a second resistor to be connected between a negative bus and the ground wire; obtaining a voltage signal formed at the first sampling module or the second sampling module; and determining whether there is a fault in the first sampling circuit and the second sampling circuit based on the voltage signal, and if there is a fault, outputting fault information, and if there is no fault, controlling the voltage withstand module to be connected to the ground wire, controlling a first switch module to disconnect the first resistor from between the positive bus and the ground wire, and controlling a second switch module to disconnect the second resistor from between the negative bus and the ground wire. In such a design, an additional detection program is further set before an insulation test, to ensure that the sampling circuit is in a normal operating state.

In some embodiments, the determining whether there is a fault in the first sampling circuit and the second sampling circuit based on the voltage signal specifically includes: calculating a theoretical voltage difference between the positive bus and the negative bus based on the voltage signal; calculating a difference between the theoretical voltage difference and an actual voltage difference between the positive bus and the negative bus; and determining whether a ratio of an absolute value of the difference between the theoretical voltage difference and the actual voltage difference to the actual voltage difference is less than a preset difference threshold, and if the ratio is less than the preset difference threshold, determining that there is no fault in the first sampling circuit and the second sampling circuit, and if the ratio is not less than the preset difference threshold, determining that there is a fault in the first sampling circuit and the second sampling circuit.

In the technical solution of the embodiments of the present application, it is designed such that a theoretical voltage between the positive bus and the negative bus is calculated based on the voltage signal obtained through sampling. Then, a difference between the obtained theoretical voltage and an actual voltage is calculated based on a sampling result to determine whether there is a fault in the first sampling circuit and the second sampling circuit, thereby improving the reliability of the insulation test.

In some embodiments, the performing an insulation test when the ground wire is connected specifically includes: obtaining a first sampling voltage formed by a first sampling module and a second sampling voltage formed by a second sampling module, respectively; controlling the first resistor to be connected between the positive bus and the ground wire when the first sampling voltage is greater than or equal to the second sampling voltage; obtaining a third sampling voltage formed by the first sampling module and a fourth sampling voltage formed by the second sampling module after the first resistor is connected; calculating a first insulation resistance between the positive bus and the ground wire and a second insulation resistance between the negative bus and the ground wire based on the first sampling voltage, the second sampling voltage, the third sampling voltage, and the fourth sampling voltage; controlling the second resistor to be connected between the negative bus and the ground wire when the first sampling voltage is less than the second sampling voltage; obtaining a fifth sampling voltage formed by the first sampling module and a sixth sampling voltage formed by the second sampling module after the second resistor is connected; and calculating a first insulation resistance between the positive bus and the ground wire and a second insulation resistance between the negative bus and the ground wire based on the first sampling voltage, the second sampling voltage, the fifth sampling voltage, and the sixth sampling voltage.

In the technical solution of the embodiments of the present application, the connection of the first resistor or the second resistor is correspondingly controlled based on a magnitude comparison between the first sampling voltage and the second sampling voltage to perform the insulation test, such that errors can be reduced, and a more accurate insulation resistance can be obtained.

In a fourth aspect, the present application provides a control apparatus for the insulation sampling circuit as described above. The control apparatus includes: a switch control unit configured to: control a voltage withstand module of the insulation sampling circuit to be connected to a ground wire, control a first switch module of the insulation sampling circuit to enable a first sampling module to be connected between a positive bus and the ground wire, and control a second switch module to enable a second sampling module to be connected between a negative bus and the ground wire; a ground wire detection unit configured to: obtain a second sampling voltage formed at the second sampling module, and determine whether the ground wire is connected based on a change trend of the second sampling voltage; an insulation test unit configured to perform an insulation test when the ground wire is connected; and a fault reporting unit configured to output fault information when the ground wire is disconnected.

In the technical solution of the embodiments of the present application, the ground wire can be connected by controlling the voltage withstand module, so that it adapts to the insulation test, and whether the ground wire has been actually connected can be detected and determined based on a change trend of the sampling voltage.

In a fifth aspect, the present application provides a battery management system. The battery management system includes: the insulation sampling circuit as described above, a processor, and a memory. The memory stores computer program instructions that, when called by the processor, cause the processor to perform the control method as described above.

In the technical solution of the embodiments of the present application, after the end of a voltage withstand test, the battery management system may enable a ground wire to be connected by controlling a voltage withstand module, so that it can adapt to the insulation test. In addition, whether the ground wire has been actually connected can also be detected and determined based on a change trend of a sampling voltage.

In a sixth aspect, the present application provides a power consuming device. The power consuming device includes: a battery, a load, and the battery management system as described above. The battery is connected to the battery management system and supplies power to the load.

In the technical solution of the embodiments of the present application, the battery management system for the power consuming device has a higher voltage withstand capacity, can enable, after the end of a voltage withstand test, a ground wire to be connected by controlling a voltage withstand module, so that its adapts to the insulation test, and can detect whether the ground wire is actually connected, thereby ensuring the accuracy of an insulation test result.

In a seventh aspect, the present application provides a computer storage medium. The computer storage medium stores computer program instructions, where the computer program instructions, when called by a processor, cause the processor to perform the control method as described above.

In the technical solution of the embodiments of the present application, the computer storage medium may be disposed in an electronic device such as a battery management system, such that the electronic device can enable, after the end of a voltage withstand test, a ground wire to be connected by controlling a voltage withstand module, so that it adapts to the insulation test, and can detect whether the ground wire is actually connected.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

Various other advantages and benefits will become apparent to those of ordinary skill in the art upon reading the following detailed description of certain implementations. Accompanying drawings are merely for the purpose of illustrating the implementations and are not to be construed as limiting the present application. Moreover, like components are denoted by like reference numerals throughout the accompanying drawings. In the drawings.

DETAILED DESCRIPTION OF EMBODIMENTS

Figure 1A:
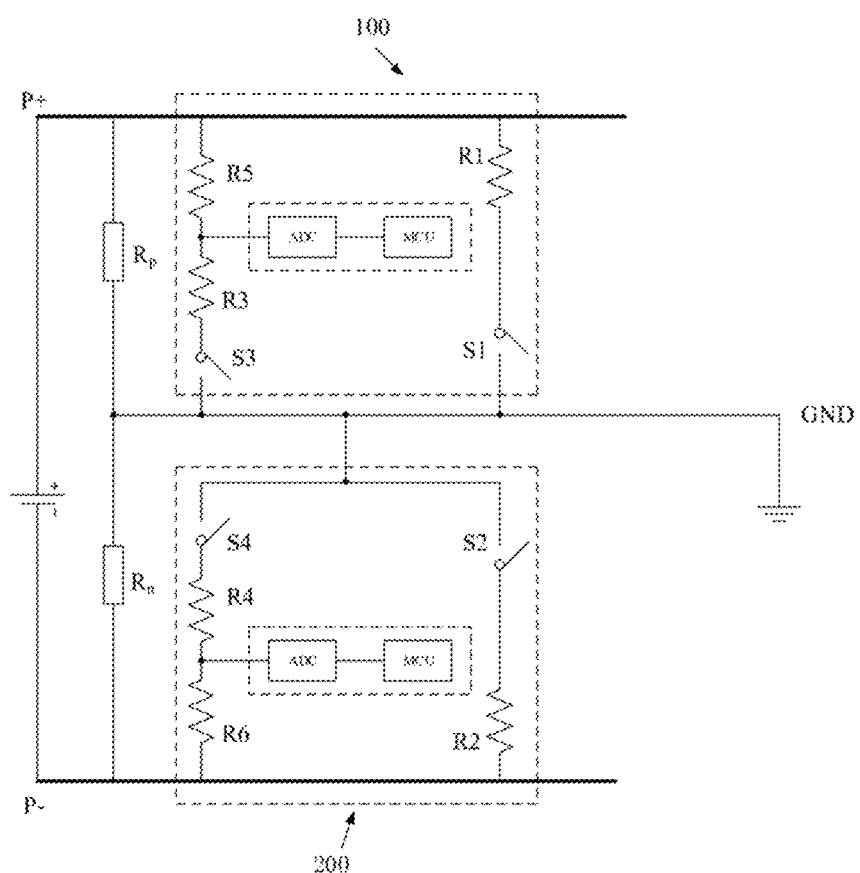
FIG. 1a is a schematic diagram of an insulation sampling circuit according to some embodiments of the present application.

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "include/comprise" and "has/have" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

At present, during use of a high-voltage battery system, an insulation test is required to prevent high voltages from causing direct damage to human bodies. A method for performing an insulation test is: controlling the connection of a known resistor using a relay, a controllable switch, or other types of electronic switch, so as to calculate insulation resistances between a high-voltage positive electrode and ground and between a high-voltage negative electrode and ground.

Referring to FIG. 1a, FIG. 1a is a schematic diagram of an insulation sampling circuit according to the embodiments of the present application.

The insulation sampling circuit is mainly composed of a first sampling circuit 100 and a second sampling circuit 200 that are connected to a positive bus of a battery and a negative bus of the battery. A battery management system can control a switch to be closed, enabling a resistor (a first resistor R1 or a second resistor R2) with a known resistance to be connected. Then, insulation resistances (represented by a resistance Rp and a resistance Rn, respectively, in FIG. 1a) between a high-voltage positive electrode and ground and between a high-voltage negative electrode and ground are calculated based on simultaneous equations of sampling voltages obtained before and after the resistor is connected.

In addition to the insulation test, usually, a voltage withstand test is also required for the high-voltage battery system before delivery. During this voltage withstand test, a higher voltage is applied between a positive bus P+ and ground/between a negative bus P− and ground GND.

It may be understood that in the insulation sampling circuit shown in FIG. 1a, this voltage applied during the voltage withstand test cannot exceed a withstand voltage of a switch (such as a switch S3 or a switch S4) used in the insulation sampling circuit. To meet the requirements of the voltage withstand test, a switch with a higher withstand voltage may be selected. However, the withstand voltage of the switch has a certain upper limit (for example, a withstand voltage limit of an optocoupler driven MOS transistor is generally 1600 V). Therefore, when a withstand voltage upper limit of a commonly used switch is reached, it is difficult to meet the requirements of a voltage withstand test for a higher voltage.

Figure 1B:
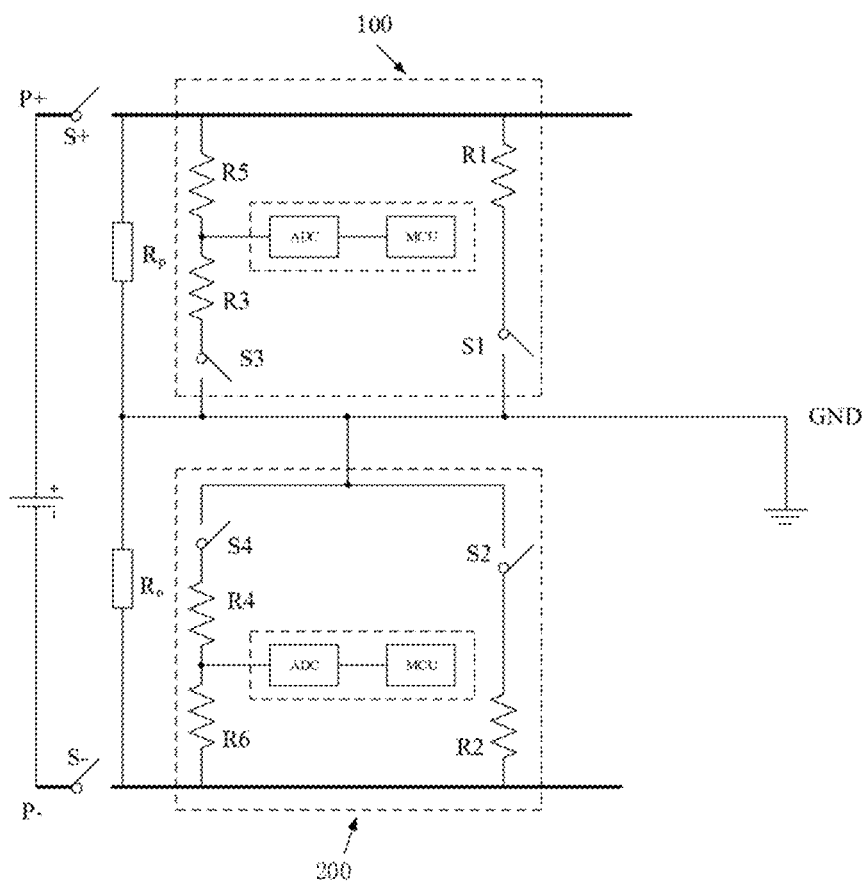
FIG. 1b is a schematic diagram of an insulation sampling circuit according to some embodiments of the present application, showing the addition of switches on a positive bus and a negative bus to improve the voltage withstand capacity.

Referring to FIG. 1B, FIG. 1B is a schematic diagram of an insulation sampling circuit according to the embodiments of the present application. In this figure, a switch S+ and a switch S− are respectively added on the positive bus P+ and the negative bus P−, as compared with the insulation sampling circuit shown in FIG. 1a. During the voltage withstand test, the switch S+ and the switch S− are kept in a closed state so as to improve the voltage withstand capacity of the insulation sampling circuit.

The applicant has found through research that there is a capacitor (such as a capacitor located on a vehicle body of a new energy vehicle on which a high-voltage battery system is mounted) between a positive bus and ground/between a negative bus and ground. Therefore, a voltage withstand module may be tested based on a trend of a sampling voltage formed by a sampling circuit, such that a switch is adjusted to be disposed on a ground wire, and the voltage withstand capacity of the circuit is improved by means of disconnecting the ground wire.

Compared with the manner, as shown in FIG. 1B, in which the switches are disposed on the positive bus and the negative bus, the manner in which a voltage withstand apparatus is disposed on the ground wire requires only one switch, thereby reducing the number of switches to be used.

A reduced number of switches may reduce material costs. In addition, as electronic devices, the switches always have a certain probability of failure, and, therefore, reducing the number of switches also reduces the probability of failure of the switches, and can thus improve the reliability of the circuit.

The battery management system disclosed in the embodiments of the present application may be used in, but not limited to, a power consuming device such as a vehicle, a ship, or an aircraft. The power consuming device includes a load that consumes electric energy, a battery that supplies power to the load, an insulation sampling circuit for voltage sampling, and a battery management system for battery management. In operation, the battery management system disclosed in the embodiments of the present application controls the insulation sampling circuit to perform an insulation test on the power consuming device during normal use, and accordingly determines the insulation of the power consuming device.

Figure 2:
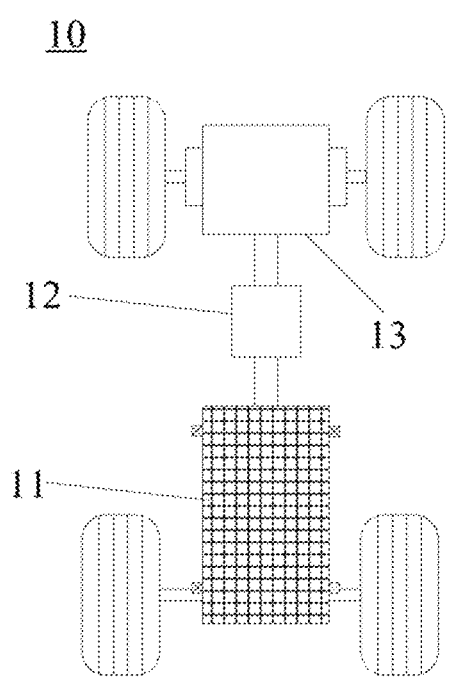
FIG. 2 is a schematic diagram of a vehicle according to some embodiments of the present application.

For ease of description of the embodiments below, an example where a power consuming device in an embodiment of the present application refers to a vehicle 10 is used for description. Referring to FIG. 2, FIG. 2 is a schematic structural diagram of a vehicle 10 provided in some embodiments of the present application.

The vehicle 10 may be a fuel vehicle, a gas vehicle, or a new energy vehicle. The new energy vehicle may be a battery electric vehicle, a hybrid electric vehicle, an extended-range vehicle, etc. A battery 11 is provided inside the vehicle 10, and the battery 11 may be provided at the bottom, the front or the back of the vehicle 10. The battery 11 may be configured to supply power to the vehicle 10. For example, the battery 11 may be used as a power supply for operating the vehicle 10. The vehicle 10 may further include a controller 12 and a motor 13. The controller 12 is configured to control the battery 11 to supply power to the motor 13, for example, to meet working power requirements during starting, navigation and traveling of the vehicle 10.

In some embodiments of the present application, the battery 11 cannot only serve as a power supply for operating the vehicle 10, but can also serve as a power supply for driving the vehicle 10, instead of or partially instead of fuel or natural gas, to provide driving power for the vehicle 10.

The battery 11 is any type of energy storage component configured to store electric energy. For example, the battery may be a single battery cell, or a battery module composed of a plurality of battery cells, or even a battery pack containing one or more battery modules. The battery 11 may be of corresponding shapes according to actual needs, such as of a cylinder and a cuboid.

In some embodiments, the plurality of battery cells in the battery module may be connected in series, in parallel, or in series and parallel, where "connected in series and parallel" refers to that the plurality of battery cells are connected in series and parallel. The battery modules that constitute the battery pack may also be connected in series, in parallel, or in series and parallel. The battery pack or the battery module may also include other structures other than the battery cells, such as a busbar components for implementing an electrical connection of the plurality of battery cells.

The controller 12 includes at least one battery management system. The battery management system is an electronic system configured to manage the battery 11 to ensure normal operation of the battery 11. The battery management system may also be connected to the insulation sampling circuit, and determines an insulation resistance between a high-voltage positive electrode of the battery and vehicle body ground of the vehicle/between a high-voltage negative electrode of the battery and vehicle body ground of the vehicle through a sampling signal formed by the insulation sampling circuit.

Before the battery is delivered, the insulation sampling circuit is in a state where the ground wire is disconnected, and thus has a better voltage withstand capacity to support the voltage withstand test. After the end of the voltage withstand test, the insulation sampling circuit switches to be in a state where the ground wire is connected, and performs, under the control of the battery management system, an insulation test of the insulation between the high-voltage positive/high-voltage negative electrode of the battery 11 and the vehicle body ground to ensure the personal safety of a vehicle user.

Figure 3:
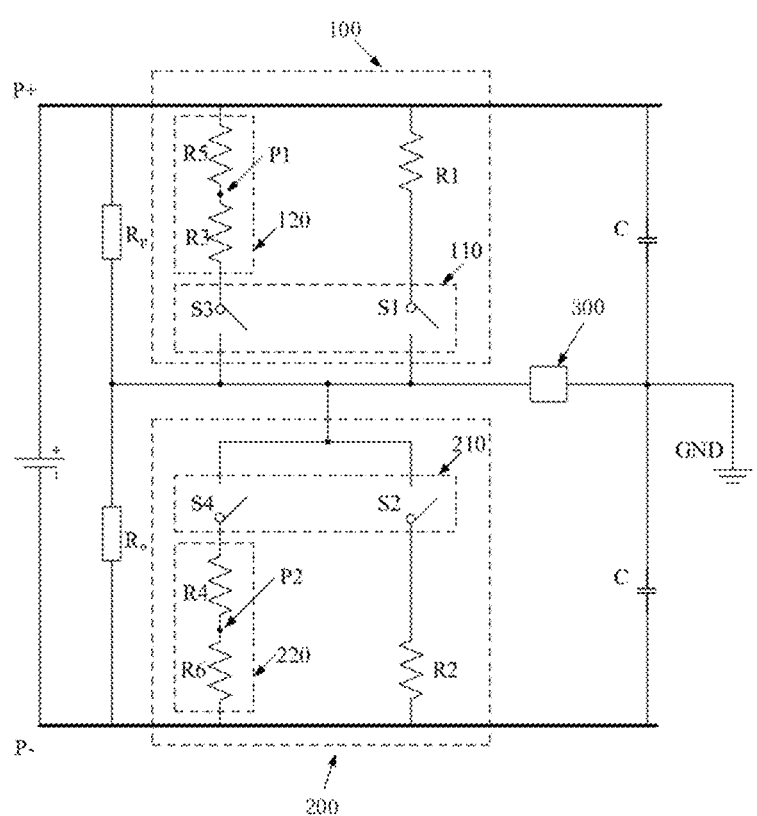
FIG. 3 is a schematic diagram of an insulation sampling circuit according to some embodiments of the present application, showing the addition of a voltage withstand module on a ground wire to improve the voltage withstand capacity.

According to some embodiments of the present application, referring to FIG. 3, FIG. 3 is a schematic structural diagram of an insulation sampling circuit according to the embodiments of the present application. There are a first insulation resistor Rp and a capacitor C between a positive bus P+ and a ground wire GND, and there are a second insulation resistor Rn and a capacitor C between a negative bus P− and ground GND. The insulation sampling circuit includes: a first sampling circuit 100, a second sampling circuit 200, and a voltage withstand module 300.

The first sampling circuit 100 includes a first switch module 110, a first resistor R1, and a first sampling module 120. The first sampling circuit 100 is a sampling circuit connected between the positive bus P+ and the ground wire GND. The first switch module 110 controls the connection or disconnection of the first sampling module 120 and/or the first resistor R1 between the positive bus P+ and the ground wire GND. The second sampling circuit 200 includes a second switch module 210, a second resistor R2, and a second sampling module 220. The second sampling circuit 200 is a sampling circuit connected between the negative bus P− and the ground wire.

Similarly, the second switch module 210 controls the connection or disconnection of the second sampling module 220 and/or the second resistor R2 between the negative bus P− and the ground wire GND.

The first sampling module 120 is connected in parallel to the first resistor R1. The second sampling module 220 is also connected in parallel to the second resistor R2. The first sampling module 120 and the second sampling module 220 are functional modules that form voltage sampling points. A battery management system may be connected to the voltage sampling points at the first sampling module and the second sampling module to obtain respective voltage signals acquired by the first sampling circuit and the second sampling circuit. Both the first resistor R1 and the second resistor R2 are external resistors with known resistances. The battery management system may allow the first resistor R1 and the second resistor R2 to be connected or disconnected by means of controlling the switch modules, so as to complete the insulation test process.

The voltage withstand module 300 is a component disposed on the ground wire and located between the first/second sampling circuit and a grounding terminal of the ground wire. The component for disconnecting the ground wire is used to improve the voltage withstand capacity of the insulation sampling circuit. The voltage withstand module 300 may be specifically any suitable type of devices, as long as it is able to disconnect the ground wire to increase a withstand voltage and also able to reconnect the ground wire.

In some embodiments, the voltage withstand module 300 may also be a device that is only able to implement single-closing. The voltage withstand module is in a turned-off state initially, and once triggered to switch to be in a turned-on state, it cannot resume.

During actual use, in a disabled state, the voltage withstand module 300 keeps the ground wire disconnected, such that the insulation sampling circuit has a better voltage withstand capacity and can complete a voltage withstand test required for a higher voltage. In addition, after the end of the voltage withstand test, the voltage withstand module switches to be in the turned-on state, such that the insulation test is performed under the control of the battery management system.

It should be noted that the above terms "first" and "second" are only used to distinguish different connected positions of functional modules, and are not used to limit specific functional modules. The first sampling circuit and the second sampling circuit may be designed using the same circuit structure, or may be designed using different circuit structures according to actual needs.

One of the advantages of the insulation sampling circuit provided in the embodiments of the present application is as follows. Simply by adding a voltage withstand module for disconnecting the ground wire, the voltage withstand capacity between the positive bus and the ground wire/between the negative bus and the ground wire may be effectively improved to meet the need of a voltage withstand test for a higher voltage.

According to some embodiments of the present application, still referring to FIG. 3, the first switch module 110 includes: a first switch S1 and a third switch S3. In addition, the second switch module 210 includes: a second switch S2 and a fourth switch S4.

One end of the first resistor R1 is connected to the positive bus P+, and the other end of the first resistor R1 is connected to the ground wire GND through the first switch S1. One end of the first sampling module 120 is connected to the positive bus P+, and the other end of the first sampling module 120 is connected to the ground wire GND through the third switch S3.

Thus, the battery management system can independently control the connection or disconnection of the first resistor R1 and the first sampling module 120 to or from a detection circuit (i.e., between the positive bus P+ and the ground wire GND) by controlling the closure and opening of the first switch S1 and the third switch S3.

One end of the second resistor R2 is connected to the negative bus P−, and the other end of the second resistor R2 is connected to the ground wire GND through the second switch S2. One end of the second sampling module 220 is connected to the negative bus P−, and the other end of the second sampling module 220 is connected to the ground wire GND through the fourth switch S4.

Thus, the battery management system can independently control the connection or disconnection of the second resistor R2 and the second sampling module 220 to or from a detection circuit (i.e., between the negative bus P− and the ground wire GND) by controlling closure and opening of the second switch S2 and the fourth switch S4.

The switch modules in the embodiments of the present application each include two switches, which are respectively configured to independently control the connection or disconnection of the sampling modules and the external resistors to or from the detection circuit, so as to implement different detection steps.

According to some embodiments of the present application, still referring to FIG. 3, the first sampling module 120 includes: a third resistor R3 and a fifth resistor R5. The second sampling module 220 includes: a fourth resistor R4 and a sixth resistor R6.

One end of the first resistor R3 is connected to the positive bus P+, and the other end of the first resistor R3 is connected to one end of the fifth resistor R5. The other end of the fifth resistor R5 is connected to the ground wire GND through the third switch S3.

Thus, a connection node between the third resistor R3 and the fifth resistor R5 connected in series forms a first voltage sampling point P1. The battery management system may be connected to the first voltage sampling point P1, to obtain a voltage signal from the first sampling circuit and perform corresponding data processing.

In addition, one end of the fourth resistor R4 is connected to the negative bus P−, and the other end of the fourth resistor R4 is connected to one end of the sixth resistor R6. The other end of the sixth resistor R6 is connected to the ground wire GND through the fourth switch S4.

Thus, a connection node between the fourth resistor R4 and the sixth resistor R6 connected in series forms a second voltage sampling point P2. The battery management system may be connected to the second voltage sampling point P2, to obtain a voltage signal from the second sampling circuit and perform corresponding data processing. In such a design, each of the sampling modules is composed of two voltage-dividing resistors connected in series, and different needs may be met by adjusting resistances of the resistors connected in series, such that a suitable voltage signal is provided for the battery management system.

Figure 4:
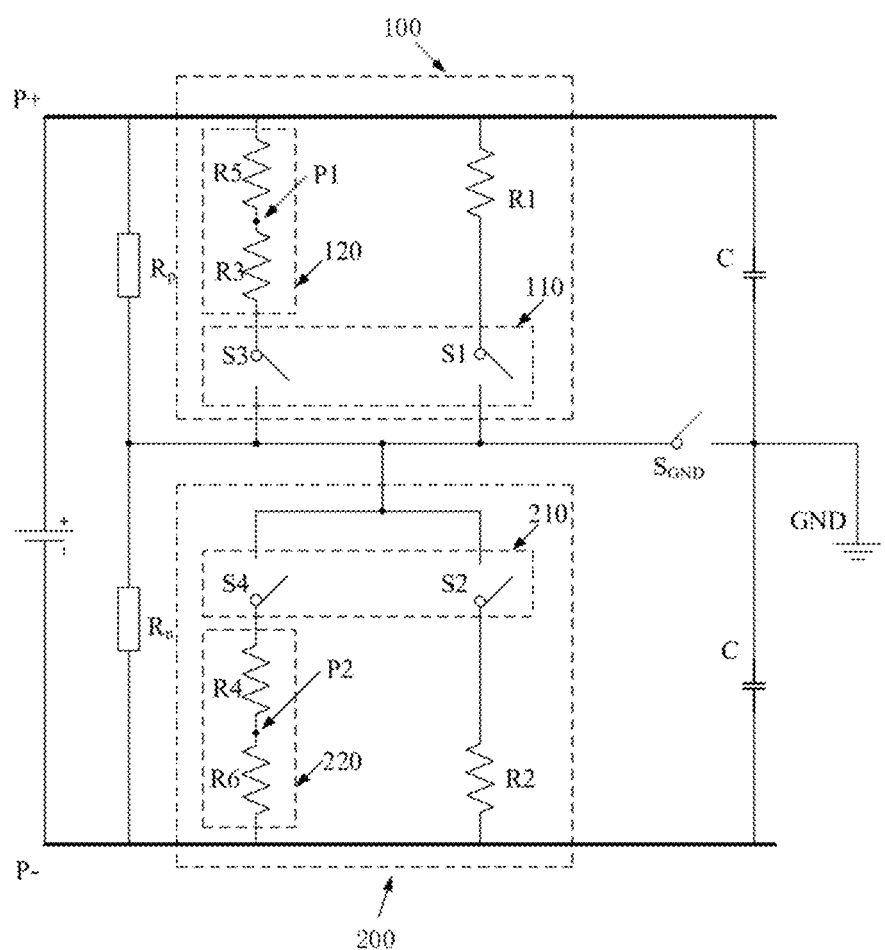
FIG. 4 is a schematic diagram of an insulation sampling circuit according to some embodiments of the present application, showing the use of a controllable switch as a voltage withstand module.

According to some embodiments of the present application, referring to FIG. 4, the voltage withstand module may include a controllable switch $S_{GND}$. The voltage withstand module may switch between a turned-off state and a turned-on state to meet the needs of a voltage withstand test and an insulation test. In the turned-off state, the voltage withstand module may enhance the voltage withstand capacity of the insulation sampling circuit. In the turned-on state, the voltage withstand module may support the battery management system to perform an insulation test.

In such a design, the ground wire can be disconnected when needed, such that the better voltage withstand capacity is provided to meet the need of a voltage withstand test, and the ground wire can also be reconnected after the end of the voltage withstand test to meet the requirements of an insulation test.

It should be noted that in this embodiment, such a term "switch" is used to represent a device that can switch between turned-on and turned-off states. According to actual needs, the switch may be specifically implemented using a suitable electronic element, such as an MOS transistor, a relay, or other types of electronic switch.

According to some embodiments of the present application, a voltage withstand test method may be generally performed once before a product is officially used, to ensure that the product meets voltage withstand standards. An embodiment of the present application provides a voltage withstand test method. Referring to FIG. 3, during a voltage withstand test, a preset voltage is applied between a positive bus P+ and a ground wire GND that are connected to the insulation sampling circuit and between a negative bus P− and the ground wire GND that are connected to the insulation sampling circuit, respectively. In this case, a voltage withstand module keeps the ground wire disconnected to ensure that the insulation sampling circuit can have a voltage withstand capacity to meet use requirements.

The preset voltage is a voltage determined based on an actual voltage withstand test, which may be specifically determined according to actual needs.

One of the advantages of the voltage withstand test method provided in the embodiments of the present application is as follows. The voltage withstand module for disconnecting the ground wire is designed such that the voltage withstand capacity of the insulation sampling circuit is enhanced, and a voltage withstand test for an ultra-high voltage can be performed to meet the needs during actual use.

Figure 5:
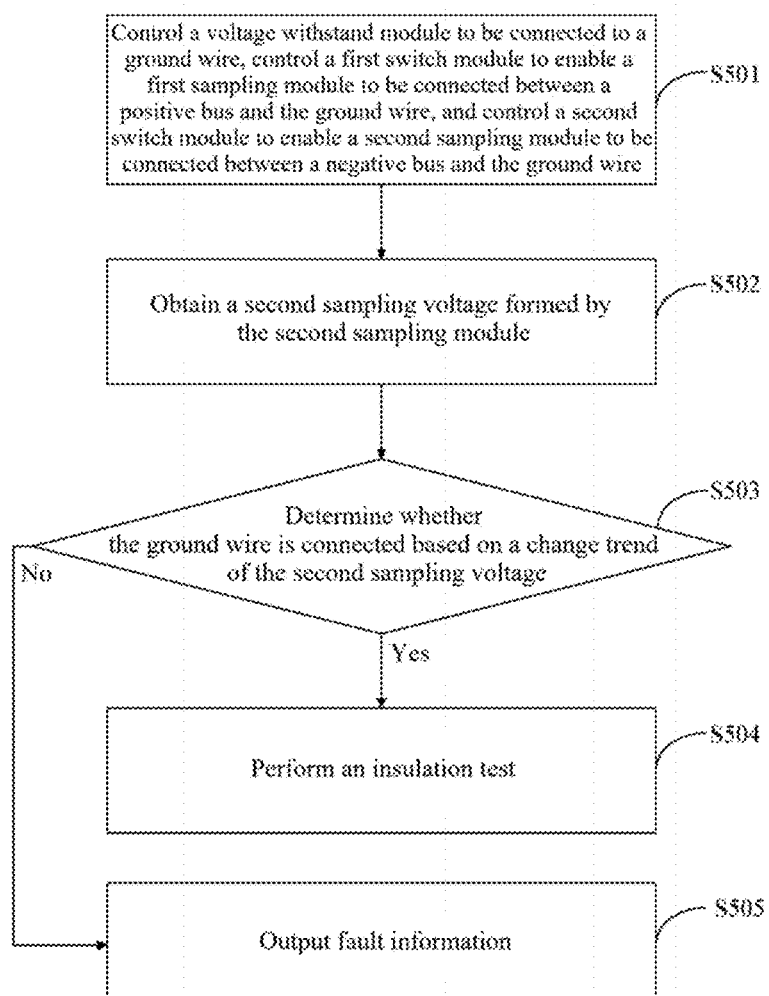
FIG. 5 is a process flowchart of a control method for an insulation sampling circuit according to some embodiments of the present application.

According to some embodiments of the present application, FIG. 5 shows a control method for an insulation sampling circuit according to some embodiments of the present application. The control method may be performed by a battery management system, to detect whether a voltage withstand module is normally turned on and correspondingly perform an insulation test. Referring to FIG. 5, the control method may include the following steps.

In S501, a voltage withstand module is controlled to be connected to a ground wire, a first switch module is controlled to enable a first sampling module to be connected between a positive bus and a ground wire, and a second switch module is controlled to enable a second sampling module to be connected between a negative bus and the ground wire.

Referring to FIG. 4, the battery management system may simultaneously control the first switch S1, the second switch S2, and the controllable switch $S_{GND}$ to be closed by providing corresponding control signals, to implement the connection of the first and second sampling modules and the connection of the voltage withstand module to the ground wire. The specific control signals used may be determined according to actual situations (such as specific switch elements used in the switch modules).

In S502, a second sampling voltage formed by the second sampling module is obtained.

The second sampling module connected to a detection circuit forms a corresponding voltage signal. In this embodiment, the "second sampling voltage" represents a voltage signal generated by the second sampling module after being connected between the negative bus and the ground wire.

In S503, whether the ground wire is connected is determined based on a change trend of the second sampling voltage. If the ground wire is connected, step S504 is performed, and if the ground wire is not connected, step S505 is performed.

The "change trend" refers to a change in the voltage value of the second sampling voltage over a certain period of time. Specifically, it may be represented in various ways, such as by a speed of increase or decrease, and by a time for increase or decrease to a steady value.

During actual use, the voltage withstand module may fail to be connected to the ground wire due to various factors, leaving the ground wire still in a disconnected state. In this case, the change trend of the sampling voltage is required to assist in detecting and determining whether the voltage withstand module fails or has a fault.

In S504, an insulation test is performed.

The connected ground wire indicates that there is no fault in the voltage withstand module at this time, and the insulation sampling circuit is normal. Thus, the battery management system may continue to perform the subsequent insulation test to calculate insulation resistances.

In S505, fault information is output.

The disconnected ground wire indicates that there is a fault in the voltage withstand module at this time, and the insulation test cannot be continued. Thus, the fault information is output to prompt a maintainer or an operator to eliminate the fault in a timely manner. The fault information may be specifically implemented in any suitable form.

One of the advantages of the control method provided in the embodiments of the present application is as follows. The detection of whether the ground wire is connected is implemented based on the change trend of the second sampling voltage, such that the failure or fault in the voltage withstand module can be found in a timely manner, thereby greatly improving the reliability of the insulation test.

Figure 6:
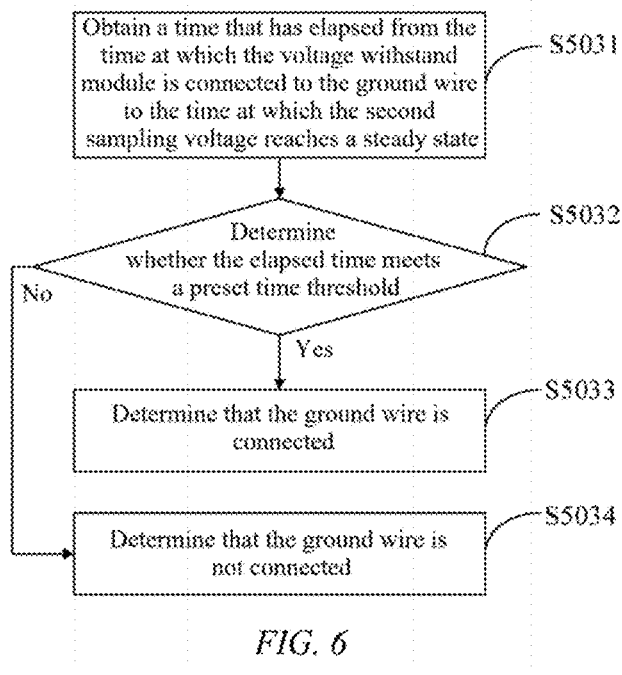
FIG. 6 is a process flowchart of a control method for an insulation sampling circuit according to some embodiments of the present application, showing a step of determining whether a ground wire is connected.

According to some embodiments of the present application, optionally, referring to FIG. 6, when the battery management system determines whether the ground wire is connected based on the change trend, the method specifically includes the following steps.

In S5031, a time that has elapsed from the time at which the voltage withstand module is connected to the ground wire to the time at which the second sampling voltage reaches a steady state is obtained.

After the voltage withstand module is connected to the ground wire, there is a process of charging a capacitor between the positive bus and the ground/between the negative bus and the ground. Thus, it takes a certain time for the second sampling voltage to reach the steady state.

The insulation sampling circuit shown in FIG. 4 is used as an example. If the first switch S1, the second switch S2, and the controllable switch $S_{GND}$ are normally closed, there is a process of charging the capacitor C between the positive bus and the ground/between the negative bus and the ground. Thus, from the moment at which the first switch S1, the second switch S2, and the controllable switch $S_{GND}$ are turned on, the second sampling voltage formed by the second voltage sampling point changes accordingly, and does not reach the steady state until the process of charging the capacitor ends. In FIG. 4, an equivalent capacitor C is used to represent the capacitor between the positive/negative bus and the ground.

In S5032, whether the elapsed time meets a preset time threshold is determined. If the elapsed time meets the preset time threshold, step S5033 is performed, and if the elapsed time does not meet the preset time threshold, step S5034 is performed.

The preset time threshold is a preset value, which may be specifically determined based on an actual circuit condition, to assist in determining whether there is the above process of charging a bus capacitor.

In S5033, it is determined that the ground wire is connected.

If it takes a longer time for the second sampling voltage to reach the steady state, it may be considered that there is the process of charging the capacitor C. Therefore, it can be determined that the voltage withstand module can be normally connected to the ground wire, and the ground wire is in a connected state.

In S5034, it is determined that the ground wire is not connected.

In contrast, if it takes a shorter time for the second sampling voltage to reach the steady state, it indicates that there is no process of charging the capacitor (which is not consistent with the normal condition). Therefore, a prompt is given indicating that the voltage withstand module is not normally connected to the ground wire, and it can be determined that the ground wire is in a disconnected state.

One of the advantages of the method for determining whether the ground wire is connected provided in the embodiments of the present application is as follows. The creative use of the process of charging the capacitor between the positive/negative bus and the ground implements the testing of the voltage withstand module disposed on the ground wire, thereby ensuring that the ground wire is in a normally connected state during an insulation test.

Figure 7:
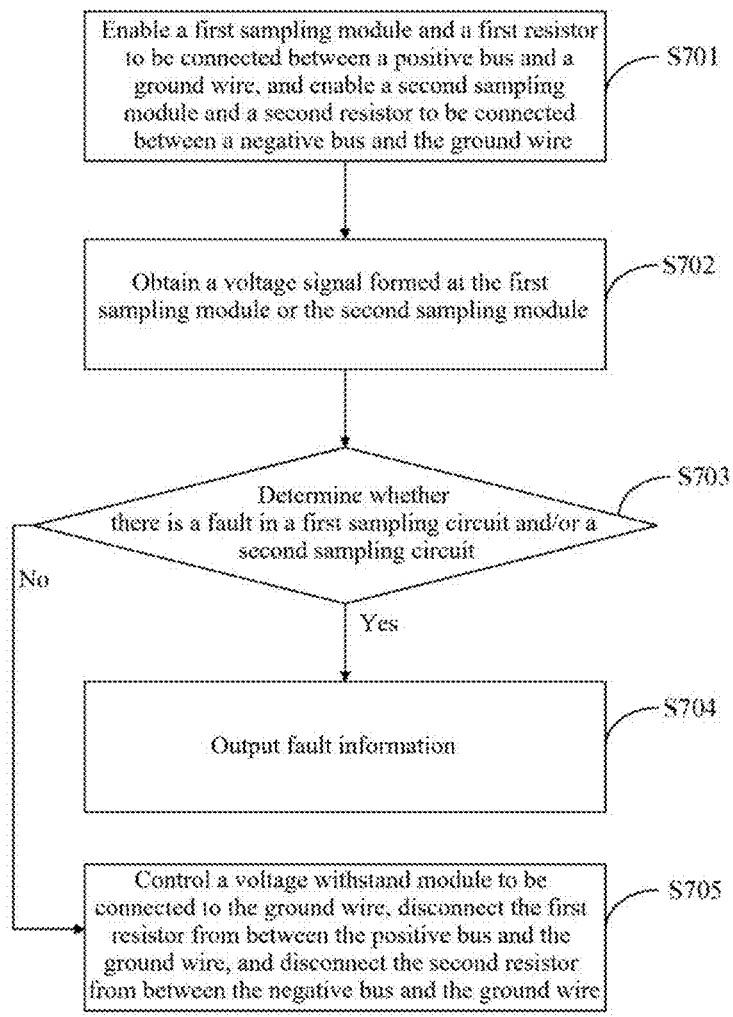
FIG. 7 is a process flowchart of a control method for an insulation sampling circuit according to some other embodiments of the present application.

According to some embodiments of the present application, FIG. 7 is a schematic diagram of a control method according to the embodiments of the present application. Before a voltage withstand module is not yet connected to a ground wire, a battery management system may perform the method steps shown in FIG. 7 to detect whether there is a fault or failure in a sampling circuit. Referring to FIG. 7, the control method may include the following steps.

In S701, a first sampling module and a first resistor are connected between a positive bus and a ground wire, and a second sampling module and a second resistor are connected between a negative bus and the ground wire.

Before the voltage withstand module is not yet connected to the ground wire, the battery management system may send a corresponding control signal to control a switch module to be closed, such that the resistor and the sampling module connected in parallel in the sampling circuit are both connected to a detection circuit (between the positive/negative bus and the ground wire), to detect whether there is a fault in the sampling circuit.

In S702, a voltage signal formed at the first sampling module or the second sampling module is obtained.

The voltage signal may be a voltage signal formed at the first sampling module, or may be a voltage signal formed at the second sampling module.

In S703, whether there is a fault in the first sampling circuit and/or the second sampling circuit is determined based on the voltage signal. If there is a fault, step S704 is performed; and if there is no fault, step S705 is performed.

If the specific circuit structure of an insulation sampling circuit is known, a voltage between the positive bus and the negative bus may be roughly inferred computationally based on the voltage signal. Thus, whether there is a fault in the sampling circuit is determined depending on whether there is a significant difference between the computationally inferred theoretical result and an actual result, thereby improving the reliability.

In S704, fault information is output.

If it is detected that there is a fault in the first sampling circuit and the second sampling circuit, corresponding fault information needs to be output to prompt a user. Specifically, the battery management system may output the fault information in any suitable form.

In S705, the voltage withstand module is controlled to be connected to the ground wire, a first switch module is controlled to disconnect the first resistor from between the positive bus and the ground wire, and a second switch module is controlled to disconnect the second resistor from between the negative bus and the ground wire.

If it is detected that there is no fault, the battery management system may control the switch modules to disconnect the first resistor and the second resistor from the detection circuit, and prepare to perform operation steps of an insulation test.

One of the advantages of the control method provided in the embodiments of the present application is as follows. Whether there is a fault in the first sampling circuit and the second sampling circuit may be detected before an insulation test, to ensure the reliability of an insulation test result.

Figure 8:
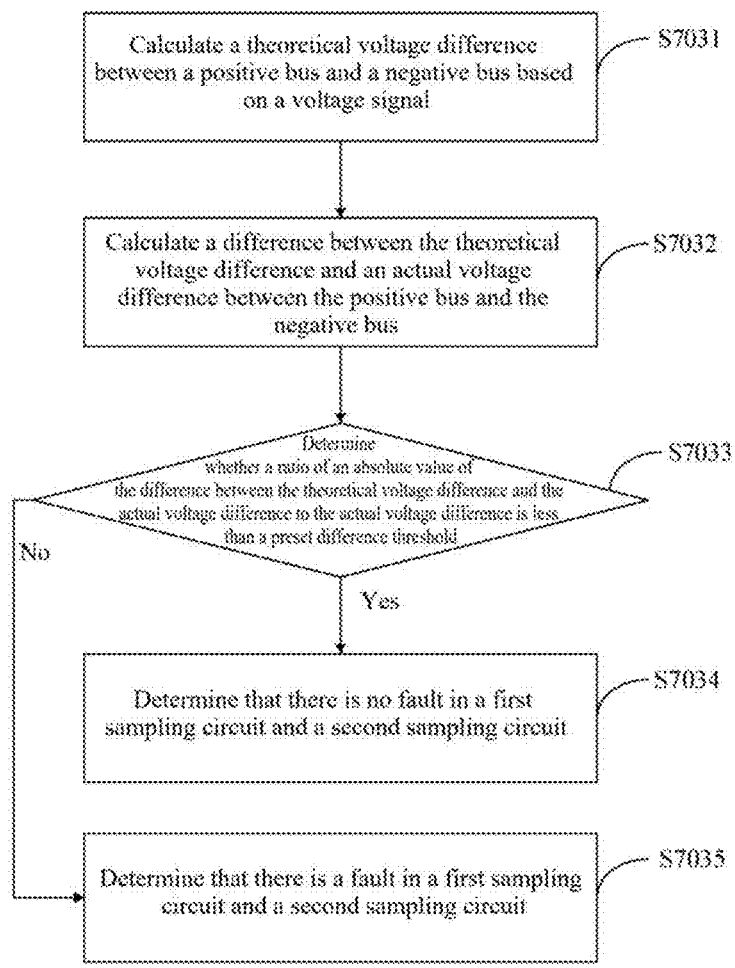
FIG. 8 is a process flowchart of a control method for an insulation sampling circuit according to some embodiments of the present application, showing a step of determining whether there is a fault in a first sampling circuit and a second sampling circuit.

According to some embodiments of the present application, optionally, still referring to FIG. 8, when the battery management system determines whether there is a fault in the sampling circuit based on the voltage signal, the control method specifically includes the following steps.

In S7031, a theoretical voltage difference between the positive bus and the negative bus is calculated based on the voltage signal.

The theoretical voltage is a theoretical value that is obtained, through reverse deduction, by the battery management system based on the sampling voltage obtained by the sampling module. The specific calculation process may be determined according to the specific circuit structure of the insulation sampling circuit.

In S7032, a difference between the theoretical voltage difference and an actual voltage difference between the positive bus and the negative bus is calculated.

The actual voltage is a known voltage that is applied between the positive bus and the negative bus. For example, it is a voltage of a battery pack connected between the positive bus and the negative bus.

Referring to FIG. 3, if both the first sampling circuit and the second sampling circuit are normal, it may be expected that the inferred theoretical voltage should be approximately equal to the actual voltage, and there is no considerable difference between the theoretical voltage and the actual voltage. Thus, whether the sampling circuit is normal may be determined based on the difference between the theoretical voltage and the actual voltage.

In S7033, whether a ratio of an absolute value of the difference between the theoretical voltage difference and the actual voltage difference to the actual voltage difference is less than a preset difference threshold is determined. If the ratio is less than the preset difference threshold, step S7034 is performed, and if the ratio is not less than the preset difference threshold, step S7035 is performed.

Specifically, the difference threshold may be determined according to actual needs, which is related to parameters such as an actual resistance and battery voltage. In the determination method, the difference between the theoretical voltage difference and the actual voltage difference is represented with the ratio of the difference between the theoretical voltage difference and the actual voltage difference to the actual voltage as a determination criterion.

In some embodiments, the difference between the theoretical voltage difference and the actual voltage difference may also be embodied using other suitable statistical methods.

In S7033, it is determined that there is no fault in the first sampling circuit and the second sampling circuit.

When a result obtained by dividing the absolute value of the difference by the voltage signal is less than the preset threshold, it indicates that both the first sampling circuit and the second sampling circuit are in line with expected conditions, and there is no fault.

In S7034, it is determined that there is a fault in the first sampling circuit and the second sampling circuit.

If the division result exceeds the preset threshold, it indicates that there is a difference between either the first sampling circuit or the second sampling circuit and the expected condition. Thus, it indicates that there is a fault in at least part of electrical elements in the first sampling circuit and the second sampling circuit, and fault information needs to be reported.

In such a design, the theoretical voltage difference between the positive bus and the negative bus may be calculated based on the voltage signal obtained through sampling, and whether the first sampling circuit and the second sampling circuit are in line with expected normal conditions is determined based on a result of comparison between the theoretical voltage difference and the actual voltage difference provided by the battery pack, such that fault detection for the first sampling circuit and the second sampling circuit is implemented.

Figure 9:
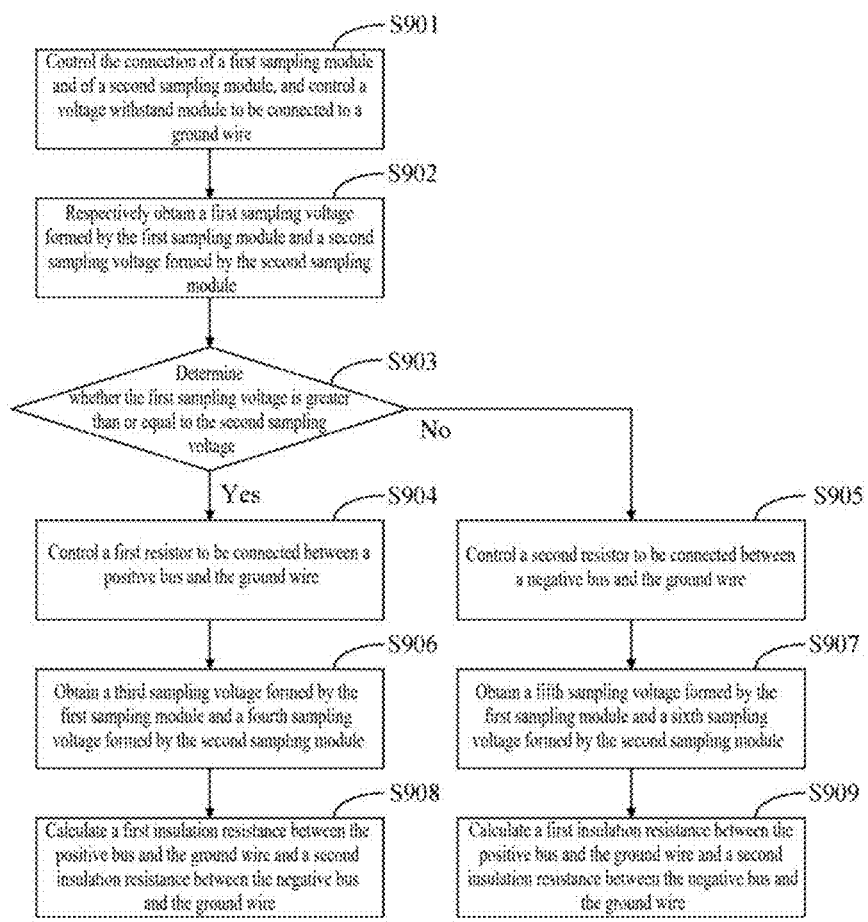
FIG. 9 is a process flowchart of a control method for an insulation sampling circuit according to some embodiments of the present application, showing a step of calculating a first insulation resistance and a second insulation resistance.

According to some embodiments of the present application, referring to FIG. 9, FIG. 9 shows a method for performing an insulation test according to some embodiments of the present application. The method for performing an insulation test may be performed by a battery management system to measure an insulation resistance between a positive bus and a ground wire/between a negative bus and a ground wire. The method may include the following steps.

In S901, the connection of a first sampling module and of a second sampling module is controlled, and a voltage withstand module is controlled to be connected to the ground wire.

The battery management system may provide corresponding control signals to switch modules, to enable the connection of the first sampling module and of the second sampling module and control the voltage withstand module to be connected to the ground wire.

In S902, a first sampling voltage formed by a first sampling module and a second sampling voltage formed by a second sampling module are respectively obtained.

With the connection of the first sampling module and of the second sampling module, referring to FIG. 3, the first sampling module and the second sampling module may form voltage signals at respective voltage sampling nodes, and provide the voltage signals to the battery management system.

In S903, whether the first sampling voltage is greater than or equal to the second sampling voltage is determined. If the first sampling voltage is greater than or equal to the second sampling voltage, step S904 is performed, and if the first sampling voltage is not greater than or equal to the second sampling voltage, step S905 is performed.

If the first sampling voltage is higher, it indicates that its corresponding side has a larger equivalent insulation resistance. Thus, step S904 may be performed, in which a first resistor R1 is connected to calculate the insulation resistance to improve the accuracy of calculation. Similarly, if the second sampling voltage is higher, a second resistor R2 needs to be connected for calculation.

In S904, the first resistor is controlled to be connected between the positive bus and the ground wire.

Referring to FIG. 3, the battery management system may enable the first resistor to be connected between the positive bus and the ground wire by controlling a first switch S1 to be closed. In this case, the connected first resistor is connected in parallel to the first sampling module.

In S906, a third sampling voltage formed by the first sampling module and a fourth sampling voltage formed by the second sampling module after the first resistor is connected are obtained.

After the first resistor is connected, a parallel resistor is added to a first sampling circuit. Therefore, voltages of the first sampling module and the second sampling module may change accordingly. In this embodiment, the voltages detected by the first sampling module and the second sampling module after the first resistor is connected are respectively referred to as the third sampling voltage and the fourth sampling voltage, which are thus distinguished from the first sampling voltage and the second sampling voltage detected by the first sampling module and the second sampling module before the first resistor is connected.

In S908, a first insulation resistance between the positive bus and the ground wire and a second insulation resistance between the negative bus and the ground wire are calculated based on the first sampling voltage, the second sampling voltage, the third sampling voltage, and the fourth sampling voltage.

Referring to FIG. 3, the insulation test requires the calculation of two unknown quantities, namely, the first insulation resistance Rp between the positive bus and the ground wire and the second insulation resistance Rn between the negative bus and the ground wire. If the specific compositions of the first sampling circuit and the second sampling circuit are known, the two unknown quantities, namely, the first insulation resistance and the second insulation resistance, may be solved through simultaneous equations of before and after the first resistor is connected.

In S905, the second resistor is controlled to be connected between the negative bus and the ground wire.

Referring to FIG. 3, the battery management system may enable the second resistor R2 to be connected between the positive bus and the ground wire by controlling a second switch S2 to be closed. In this case, the connected second resistor is connected in parallel to the second sampling module.

In S907, a fifth sampling voltage formed by the first sampling module and a sixth sampling voltage formed by the second sampling module after the second resistor is connected are obtained.

After the second resistor is connected, a parallel resistor is added to a second sampling circuit. Therefore, voltages of the first sampling module and the second sampling module may change accordingly. In this embodiment, the voltages detected by the first sampling module and the second sampling module after the second resistor is connected are respectively referred to as the fifth sampling voltage and the sixth sampling voltage, which are thus distinguished from the first sampling voltage and the second sampling voltage detected by the first sampling module and the second sampling module before the second resistor is connected.

In S909, a first insulation resistance between the positive bus and the ground wire and a second insulation resistance between the negative bus and the ground wire are calculated based on the first sampling voltage, the second sampling voltage, the fifth sampling voltage, and the sixth sampling voltage.

Similar to the above step S908, if the specific compositions of the first sampling circuit and the second sampling circuit are known, the two unknown quantities, namely, the first insulation resistance Rp and the second insulation resistance Rn, may be solved through simultaneous equations of before and after the second resistor is connected.

One of the advantages of the method for performing an insulation test provided in the embodiments of the present application is as follows. Whether the first resistor or the second resistor is connected is determined based on a magnitude relationship between the first sampling voltage and the second sampling voltage, such that a more accurate insulation resistance can be obtained.

According to some embodiments of the present application, FIGS. 10a to 10e are schematic diagrams of an insulation sampling circuit according to the embodiments of the present application during use. Referring to FIGS. 10a to 10e, the insulation sampling circuit includes: a first resistor R1, a second resistor R2, a third resistor R3, a fourth resistor R4, a fifth resistor R5, a sixth resistor R6, a first switch S1, a second switch S2, a third switch S3, a fourth switch S4, and a controllable switch $S_{GND}$. The first resistor R1 has the same resistance as the second resistor R2, and the fifth resistor R5 has the same resistance as the fourth resistor R4.

The first resistor R1, the third resistor R3, the fifth resistor R5, the first switch S1, and the third switch S3 constitute a first sampling circuit 100. One end of the first resistor R1 is connected to a positive bus P+, and the other end of the first resistor R1 is connected to a ground wire GND through the first switch S1. One end of the first resistor R3 is connected to the positive bus P+, and the other end of the first resistor R3 is connected to one end of the fifth resistor R5. The other end of the fifth resistor R5 is connected to the ground wire GND through the third switch S3. A connection node between the third resistor R3 and the fifth resistor R5 connected in series forms a first voltage sampling point P1.

In some embodiments, the first voltage sampling point P1 may be connected to an analog-to-digital converter (ADC) chip. After the ADC chip converts an analog voltage signal into a digital signal, a voltage in the form of the digital signal may be provided to a micro control unit (MCU) through an isolation communication chip.

The second resistor R2, the fourth resistor R4, the sixth resistor R6, the second switch S2, and the fourth switch S4 constitute a second sampling circuit. One end of the second resistor R2 is connected to a negative bus P−, and the other end of the second resistor R2 is connected to the ground wire GND through the second switch S2. One end of the fourth resistor R4 is connected to the negative bus P−, and the other end of the fourth resistor R4 is connected to one end of the sixth resistor R6. The other end of the sixth resistor R6 is connected to the ground wire GND through the fourth switch S4. A connection node between the fourth resistor R4 and the sixth resistor R6 connected in series forms a second voltage sampling point P2.

In some embodiments, the second voltage sampling point P2 may be connected to an analog-to-digital converter (ADC) chip. After the ADC chip converts an analog voltage signal into a digital signal, a voltage in the form of the digital signal may be provided to a micro control unit (MCU) through an isolation communication chip.

The controllable switch $S_{GND}$ is disposed on the ground wire GND, located between the first/second sampling circuit and a grounding node 3, and configured to control the disconnection or connection of the ground wire.

Figure 10A:
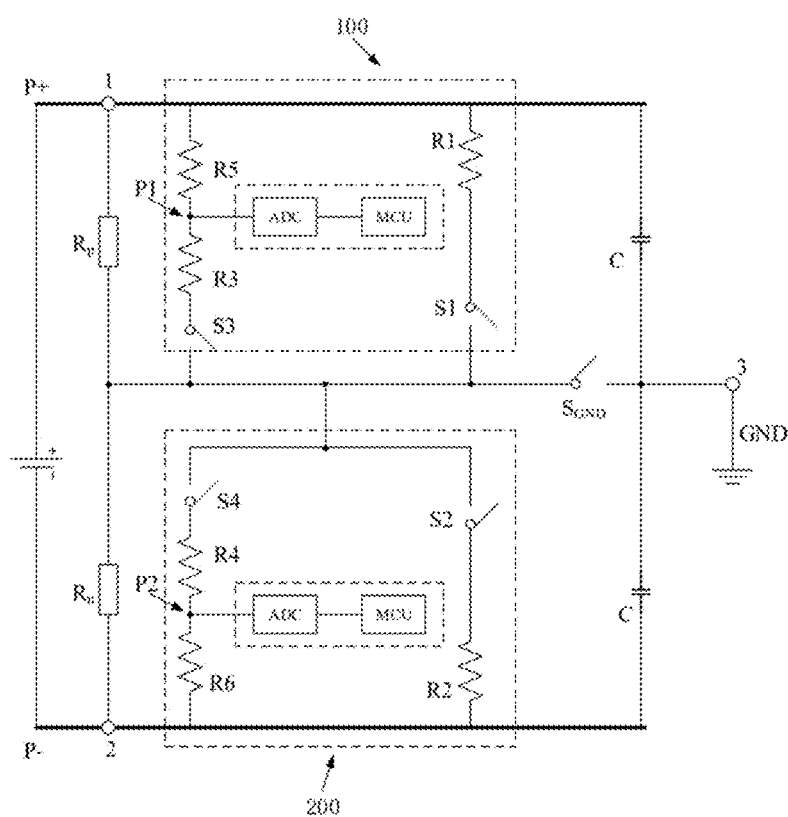
FIG. 10a is a schematic diagram of an insulation sampling circuit according to some embodiments of the present application, showing a switch state during a voltage withstand test.

Referring to FIG. 10a, in an initial state, the controllable switch $S_{GND}$ keeps the ground wire disconnected. The insulation sampling circuit has a better voltage withstand capacity. Thus, the requirements of a voltage Vh applied between a high-voltage positive electrode 1 and the grounding node 3, and a voltage Vh applied between a high-voltage negative electrode 2 and the grounding node 3, during a voltage withstand test, are met.

Figure 10B:
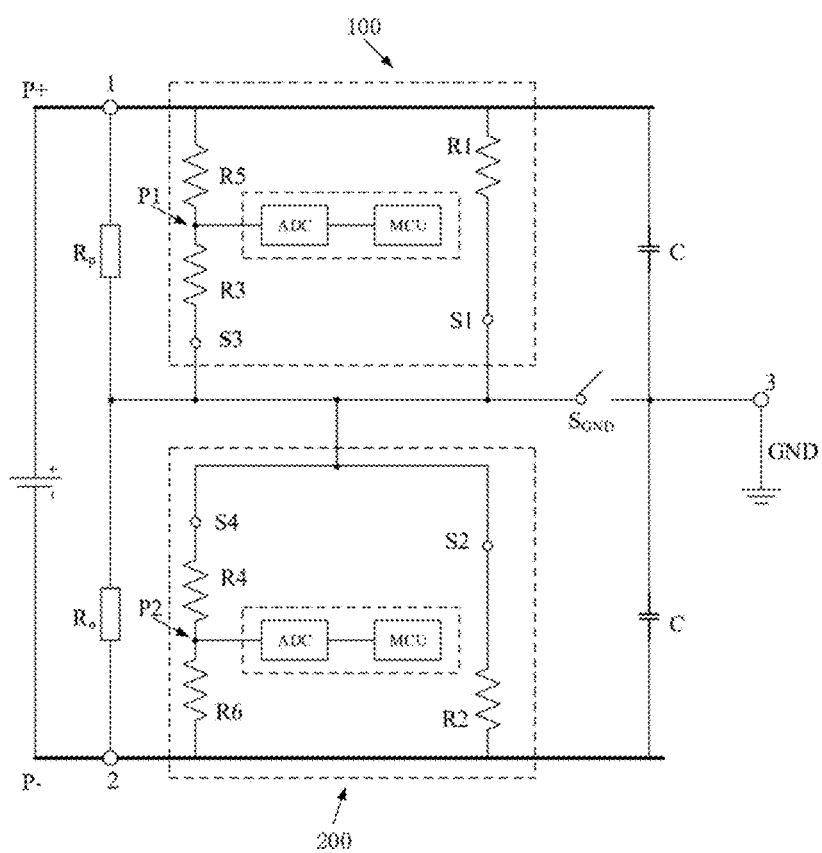
FIG. 10b is a schematic diagram of an insulation sampling circuit according to some embodiments of the present application, showing a switch state during detection of whether there is a fault in a first sampling circuit and a second sampling circuit.

Referring to FIG. 10b, upon detecting a low-voltage (such as 12 V) power-on of a vehicle and starts preparation for an insulation test, a battery management system controls the first switch S1, the second switch S2, the third switch S3, and the fourth switch S4 to be closed, and the controllable switch $S_{GND}$ to be opened, so as to perform fault detection on the first sampling circuit and the second sampling circuit.

When the step of fault detection is performed, the battery management system may calculate an estimated voltage U3 between the high-voltage positive electrode 1 and the high-voltage negative electrode 2 based on a second sampling voltage acquired by the second sampling circuit through the following equation (1):

$$U_3 = U_{adc} \times \frac{r4+r6}{r6} \times \frac{\frac{(r4+r6) \times r1}{r1+r4+r6}}{\frac{(r4+r6) \times r1}{r1+r4+r6} + \frac{(r4+r3) \times r1}{r1+r4+r3}} \quad (1)$$

where Uadc is a voltage obtained, through sampling, by an ADC chip at the second voltage sampling point, r1 is a resistance of the first resistor R1 (which is the same as a resistance of the second resistor R2), r3 is a resistance of the third resistor R3, r4 is a resistance of the fourth resistor R4 (which is the same as a resistance of the fifth resistor R5), and r6 is a resistance of the sixth resistor R6.

Then, a difference X between a theoretical voltage U3 and an actual voltage U4 between the high-voltage positive electrode 1 and the high-voltage negative electrode 2 is calculated through the following equation (2):

$$X = \frac{|U_4 - U_3|}{U_4} \quad (2)$$

When the difference X between the theoretical voltage and the actual voltage is less than a preset threshold, the battery management system may determine that the first sampling circuit and the second sampling circuit are in a normal state, and there is no fault. When the difference X between the theoretical voltage and the actual voltage is greater than or equal to the preset threshold, the battery management system may determine that there is a fault in the first sampling circuit and the second sampling circuit, and fault information needs to be output to prompt a user to handle it in a timely manner.

Figure 10C:
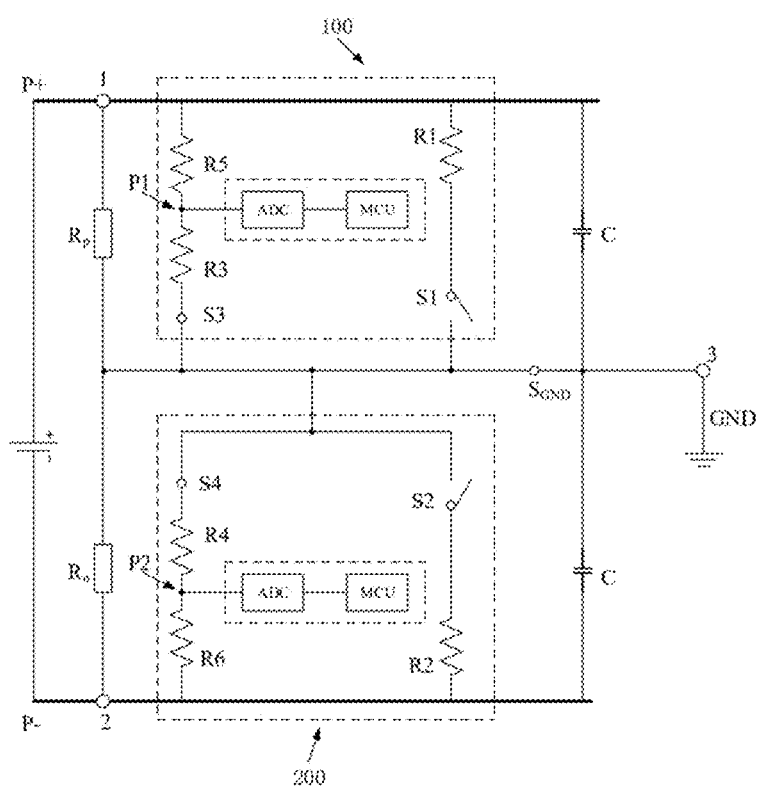
FIG. 10c is a schematic diagram of an insulation sampling circuit according to some embodiments of the present application, showing a switch state during detection of whether a controllable switch is normally connected to a ground wire.

Referring to FIG. 10c, Upon detecting and determining that there is no fault in the first sampling circuit and the second sampling circuit, the battery management system can control the third switch S3, the fourth switch S4, and the controllable switch $S_{GND}$ to be closed.

The battery management system may detect whether the controllable switch $S_{GND}$ has been successfully closed depending on whether a rising trend and a falling trend of the second sampling voltage provided by the second sampling circuit are consistent with a process of charging a capacitor C between the positive/negative bus and ground during a time period from the moment at which the third switch S3, the fourth switch S4, and the controllable switch $S_{GND}$ are controlled to be closed to the time at which the second sampling voltage reaches a steady state.

If it is determined that the controllable switch $S_{GND}$ has not been successfully closed, corresponding fault information may be output to prompt the user to handle it as soon as possible. However, if it is determined that the controllable switch $S_{GND}$ has been successfully closed, subsequent insulation test steps may be continued.

In a switch state of FIG. 10c, the battery management system obtains a first sampling voltage V1 at the first voltage sampling point P1 and a second sampling voltage V2 at the second voltage sampling point P2, respectively.

Figure 10D:
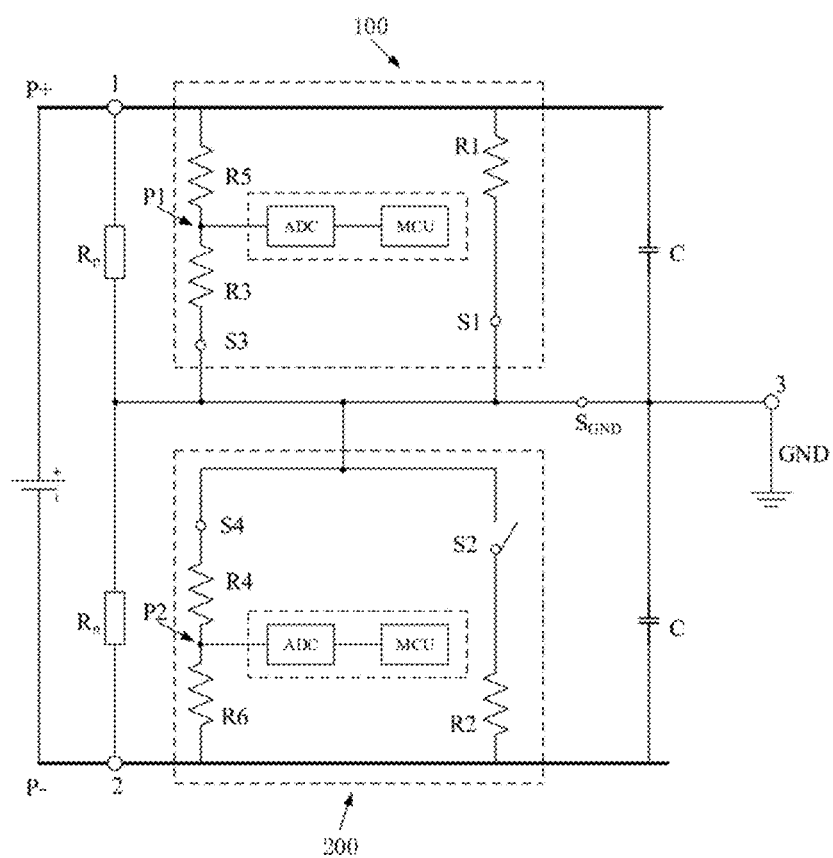
FIG. 10d is a schematic diagram of an insulation sampling circuit according to some embodiments of the present application, showing a switch state of when a first sampling voltage is greater than or equal to a second sampling voltage during an insulation test.

Referring to FIG. 10d, if the first sampling voltage V1 is greater than or equal to the second sampling voltage V2, the battery management system can control the first switch S1 to be closed, enabling the first resistor R1 to be connected. Then, a third sampling voltage V3 at the first voltage sampling point P1 and a fourth sampling voltage V4 at the second voltage sampling point P2 in this case are respectively obtained.

Finally, a first insulation resistance Rp between the high-voltage positive electrode 1 and the grounding node 3 and a second insulation resistance Rn between the high-voltage negative electrode 2 and the grounding node 3 can be calculated through the following equations (3-1) and (3-2), respectively:

$$U_p = \frac{r1 \times (r4 + r3) \times (V1 \times V4 - V2 \times V3)}{(r1 + r4 + r3) \times V2 \times V3 - r1 \times V1 \times V4} \quad (3-1)$$

$$U_n = \frac{r1 \times (r4 + r6) \times (V1 \times V4 - V2 \times V3)}{(r4 + r6) \times V2 \times V3 - r1 \times (V1 \times V4 - V2V3)} \quad (3-2)$$

where r1 is a resistance of the first resistor R1 (which is the same as a resistance of the second resistor R2), r3 is a resistance of the third resistor R3, r4 is a resistance of the fourth resistor R4 (which is the same as a resistance of the fifth resistor R5), and r6 is a resistance of the sixth resistor R6.

Figure 10E:
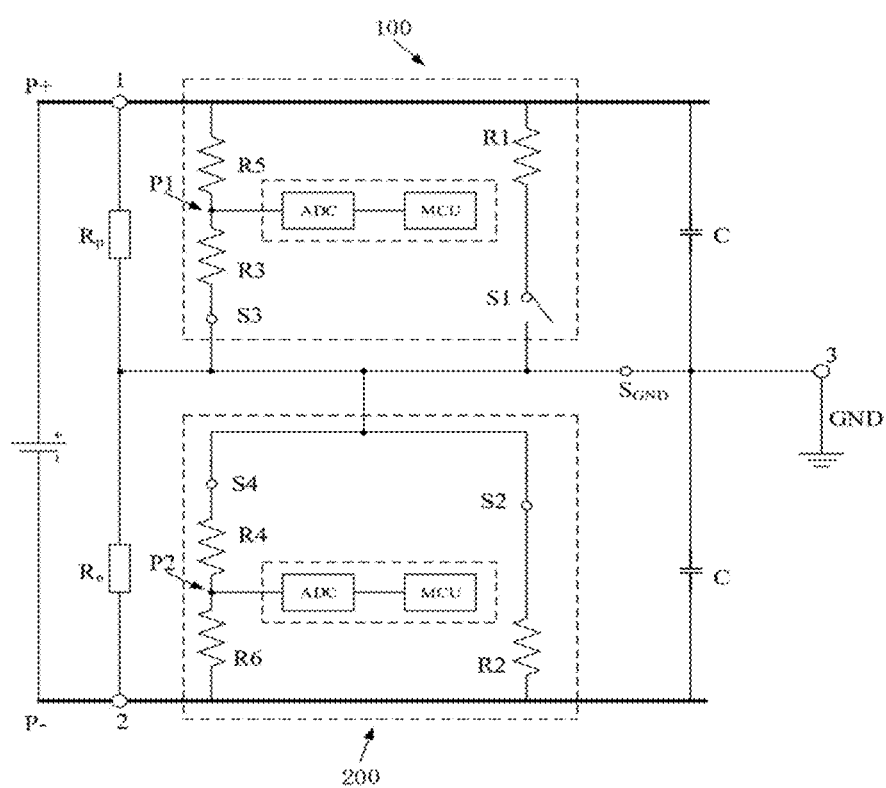
FIG. 10e is a schematic diagram of an insulation sampling circuit according to some embodiments of the present application, showing a switch state of when a first sampling voltage is less than a second sampling voltage during an insulation test.

Referring to FIG. 10e, if the first sampling voltage V1 is less than the second sampling voltage V2, the battery management system may control the second switch S2 to be closed, enabling the second resistor R2 to be connected. Then, a fifth sampling voltage V5 at the first voltage sampling point P1 and a sixth sampling voltage V6 at the second voltage sampling point P2 in this case are respectively obtained.

Finally, a first insulation resistance Rp between the high-voltage positive electrode 1 and the grounding node 3 and a second insulation resistance Rn between the high-voltage negative electrode 2 and the grounding node 3 can be calculated through the following equations (4-1) and (4-2), respectively:

$$U_p = \frac{r1 \times (r2 + r3) \times (V1 \times V6 - V2 \times V5)}{r1 \times (V2 \times V4 - V1 \times V6) - (r1 + r3) \times V2 \times V6} \quad (4-1)$$

$$U_n = \frac{r1 \times (r2 + r4) \times (V1 \times V6 - V2 \times V5)}{r1 \times V2 \times V5 - (r1 + r2 + r4) \times V1 \times V6} \quad (4-2)$$

where r1 is a resistance of the first resistor R1 (which is the same as a resistance of the second resistor R2), r3 is a resistance of the third resistor R3, r4 is a resistance of the fourth resistor R4 (which is the same as a resistance of the fifth resistor R5), and r6 is a resistance of the sixth resistor R6.

Figure 11:
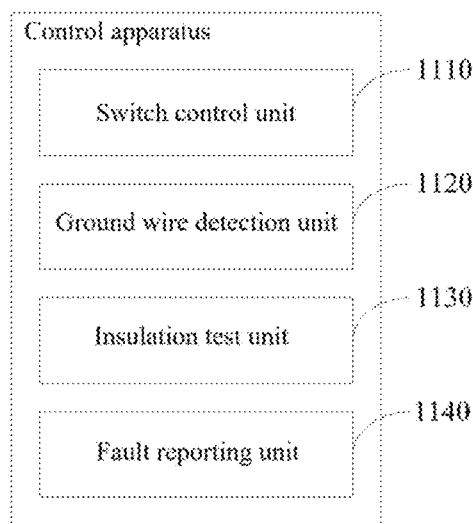
FIG. 11 is a schematic diagram of a control apparatus according to some embodiments of the present application.

According to some embodiments of the present application, referring to FIG. 11, FIG. 11 shows a control apparatus for an insulation sampling circuit according to the embodiments of the present application. The control apparatus may be implemented by a battery management system. The control apparatus may include: a switch control unit 1110, a ground wire detection unit 1120, an insulation test unit 1130, and a fault reporting unit 1140.

The switch control unit 1110 is configured to: control a voltage withstand module to be connected to a ground wire, control a first switch module to enable a first sampling module to be connected between a positive bus and the ground wire, and control a second switch module to enable a second sampling module to be connected between a negative bus and the ground wire. The ground wire detection unit 1120 is configured to: obtain a second sampling voltage formed at the second sampling module, and determine whether the ground wire is connected based on a change trend of the second sampling voltage. The insulation test unit 1130 is configured to perform an insulation test when the ground wire is connected. The fault reporting unit 1140 is configured to output fault information if the ground wire is disconnected.

One of the advantages of the control method provided in the embodiments of the present application is as follows. The detection of whether the ground wire is connected can be implemented based on the change trend of the second sampling voltage, such that the failure or fault in the voltage withstand module can be found in a timely manner, thereby greatly improving the reliability of the insulation test.

According to some embodiments of the present application, optionally, the insulation test unit 1130 is specifically configured to: obtain a time that has elapsed from the time at which the voltage withstand module is connected to the ground wire to the time at which the second sampling voltage reaches a steady state; and determine whether the elapsed time meets a preset time threshold, and if the elapsed time meets the preset time threshold, determine that the ground wire is connected. In such a design, the creative use of the process of charging the capacitor between the positive/negative bus and the ground implements the testing of the voltage withstand module, thereby ensuring that the ground wire can be in a normally connected state during an insulation test.

Figure 12:
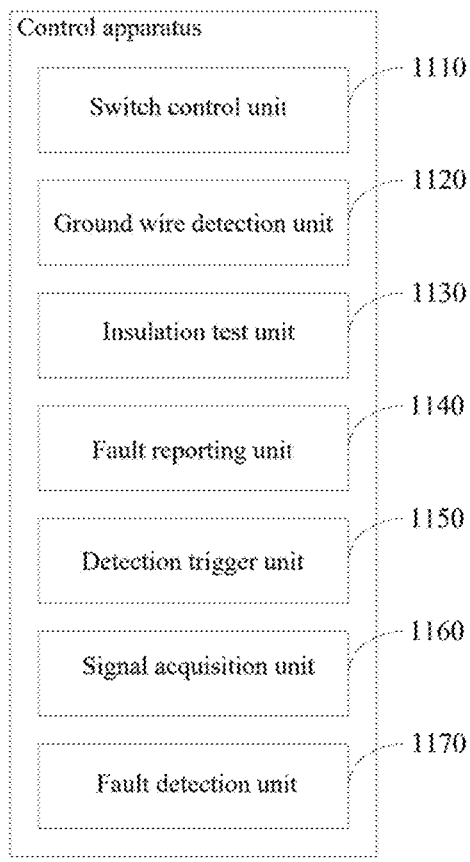
FIG. 12 is a schematic diagram of a control apparatus according to some other embodiments of the present application.

According to some embodiments of the present application, referring to FIG. 12, FIG. 12 shows a control apparatus for an insulation sampling circuit according to some other embodiments of the present application. In addition to the functional modules shown in FIG. 11, the control apparatus further includes a detection trigger unit 1150, a signal acquisition unit 1160, and a fault detection unit 1170.

The detection trigger unit 1150 is configured to control switch modules, to enable a first sampling module and a first resistor of an insulation sampling circuit to be connected between a positive bus and a ground wire, and enable a second sampling module and a second resistor of the insulation sampling circuit to be connected between a negative bus and the ground wire. The signal acquisition unit 1160 is configured to obtain a voltage signal formed by the first sampling module or the second sampling module.

The fault detection unit 1170 is configured to determine whether there is a fault in a first sampling circuit and a second sampling circuit based on the voltage signal. The fault reporting unit 1140 is further configured to output fault information if there is a fault. The insulation test unit 1130 is further configured to, if there is no fault, control the voltage withstand module to be connected to the ground wire, control the first switch module to disconnect the first resistor from between the positive bus and the ground wire, and control the second switch module to disconnect the second resistor from between the negative bus and the ground wire, so as to prepare for an insulation test.

In such a design, a step of detecting whether there is a fault in the first sampling circuit and the second sampling circuit before an insulation test is added to ensure the reliability of an insulation test result.

According to some embodiments of the present application, optionally, the fault detection unit 1170 is specifically configured to: calculate a theoretical voltage difference between the positive bus and the negative bus based on the voltage signal; calculate a difference between the theoretical voltage difference and an actual voltage difference between the positive bus and the negative bus; and determine whether a ratio of an absolute value of the difference between the theoretical voltage difference and the actual voltage difference to the actual voltage difference is less than a preset difference threshold, and if the ratio is less than the preset difference threshold, determine that there is no fault in the first sampling circuit and the second sampling circuit, and if the ratio is not less than the preset difference threshold, determine that there is a fault in the first sampling circuit and the second sampling circuit.

In such a design, the theoretical voltage difference between the positive bus and the negative bus may be calculated based on the voltage signal obtained through sampling, and whether the first sampling circuit and the second sampling circuit are in line with expected normal conditions is determined based on a result of comparison between the theoretical voltage difference and the actual voltage difference provided by the battery pack, such that fault detection for the first sampling circuit and the second sampling circuit is implemented.

According to some embodiments of the present application, optionally, the insulation test unit 1130 is specifically configured to: obtain a first sampling voltage formed by the first sampling module and a second sampling voltage formed by the second sampling module, respectively, and perform a corresponding insulation test step based on a result of comparison in magnitude between the first sampling voltage and the second sampling voltage.

When the first sampling voltage is greater than or equal to the second sampling voltage, the insulation test unit 1130 may be configured to: control the first resistor to be connected between the positive bus and the ground wire; obtain a third sampling voltage formed by the first sampling module and a fourth sampling voltage formed by the second sampling module after the first resistor is connected; and calculate a first insulation resistance between the positive bus and the ground wire and a second insulation resistance between the negative bus and the ground wire based on the first sampling voltage, the second sampling voltage, the third sampling voltage, and the fourth sampling voltage.

In addition, when the first sampling voltage is less than the second sampling voltage, the insulation test unit 1130 may be configured to: control the second resistor to be connected between the negative bus and the ground wire; obtain a fifth sampling voltage formed by the first sampling module and a sixth sampling voltage formed by the second sampling module after the second resistor is connected; and calculate a first insulation resistance between the positive bus and the ground wire and a second insulation resistance between the negative bus and the ground wire based on the first sampling voltage, the second sampling voltage, the fifth sampling voltage, and the sixth sampling voltage.

In such a design, whether the first resistor or the second resistor is connected may be determined based on a magnitude relationship between the first sampling voltage and the second sampling voltage, such that a more accurate insulation resistance can be obtained.

It should be noted that in the embodiments of the present application, the functional units of the control apparatus for the insulation sampling circuit are divided according to the method steps to be performed. In some embodiments, one or more functional units (the switch control unit, the ground wire detection unit, the insulation test unit, the fault reporting unit, the detection trigger unit, the signal acquisition unit, and the fault detection unit) in the control apparatus according to the embodiments of the present application may be split into more functional units according to actual needs, so as to perform corresponding method steps. In some other embodiments, one or more functional units in the control apparatus according to the embodiments of the present application may also be integrated into fewer functional units, so as to perform corresponding method steps.

Figure 13:
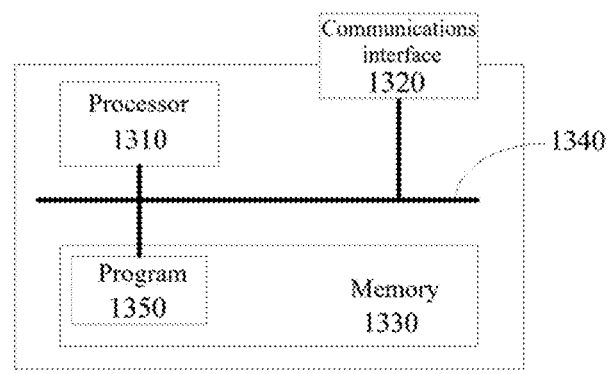
FIG. 13 is a schematic diagram of a battery management system according to some embodiments of the present application.

According to some embodiments of the present application, referring to FIG. 13, FIG. 13 is a schematic structural diagram of a battery management system according to the embodiments of the present application. The battery management system may be applied to any type of batteries or power consuming devices. The specific implementation of the battery management system is not limited herein.

As shown in FIG. 13, the battery management system may include: a processor 1310, a communications interface 1320, a memory 1330, and a communication bus 1340.

The processor 1310, the communications interface 1320, and the memory 1330 communicate with each other through a communication bus 1340. The communications interface 1320 is configured to be communicatively connected to other devices (for example, to be connected to an insulation sampling circuit, to obtain voltage signals from a first sampling module and a second sampling module). The processor 1310 is configured to call a program 1350 to perform one or more method steps in the control method for an insulation sampling circuit in the above embodiments. Specifically, the program 1350 may include program codes or computer operation instructions.

In this embodiment, depending on the type of hardware used, the processor 1310 may be a central processing unit, other general-purpose processors, a digital signal processor, an application-specific integrated circuit, a field programmable gate array or other programmable logic devices, a discrete gate or a transistor logic device, a discrete hardware component, etc.

The memory 1330 is configured to store the program 1350. The memory 1330 may include a high speed RAM memory, and may also include a non-transitory memory, such as at least one disk memory.

An embodiment of the present application further provides a computer-readable storage medium. The computer-readable storage medium may be a non-volatile computer-readable storage medium. The computer-readable storage medium stores a computer program.

The computer program, when executed by a processor, implements one or more method steps in the control method for an insulation sampling circuit in the above embodiments. A complete computer program product is embodied on one or more computer-readable storage media (including, but not limited to, a disk memory, a CD-ROM, an optical memory, etc.) containing the computer program disclosed in the embodiments of the present application.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A control method for an insulation sampling circuit, wherein:
    the insulation sampling circuit comprises:
        a first sampling circuit, comprising: a first sampling module, a first resistor, and a first switch module, wherein:
            the first resistor is connected in parallel to the first sampling module, and the first switch module is configured to control the first sampling module and/or the first resistor to be connected between a positive bus and a ground wire;
        a second sampling circuit, comprising: a second sampling module, a second resistor, and a second switch module, wherein:
            the second resistor is connected in parallel to the second sampling module, and the second switch module is configured to control the second sampling module and/or the second resistor to be connected between a negative bus and a ground wire; and
        a voltage withstand module disposed on the ground wire and capable of controlling switching between a state where the ground wire is disconnected from the ground and a state where the ground wire is connected to the ground;
        wherein:
            the first sampling module performs voltage-dividing at both ends and provides a first voltage sampling point, and the first sampling circuit detects a voltage at the first voltage sampling point; and
            the second sampling module performs voltage-dividing at both ends and provides a second voltage sampling point, and the second sampling circuit detects a voltage at the second voltage sampling point; and the control method comprises:
        first control: controlling the voltage withstand module of the insulation sampling circuit to enable the ground wire to be connected to the ground, controlling the first switch module of the insulation sampling circuit to enable the first sampling module to be connected between a positive bus and the ground wire, and controlling the second switch module to enable the second sampling module to be connected between a negative bus and the ground wire;
        obtaining a second sampling voltage formed by the second sampling module in a state where the first control has been performed;
        determining whether the ground wire is connected based on a change in the voltage value of the second sampling voltage over a period of time;
        performing an insulation test when the ground wire is connected; and
        outputting fault information when the ground wire is disconnected from the ground.

2. The control method according to claim 1, wherein the first switch module comprises: a first switch and a third switch; and the second switch module comprises: a second switch and a fourth switch,
    wherein one end of the first resistor is connected to the positive bus, and the other end of the first resistor is connected to the ground wire through the first switch;
    one end of the first sampling module is connected to the positive bus, and the other end of the first sampling module is connected to the ground wire through the third switch;
    one end of the second resistor is connected to the negative bus, and the other end of the second resistor is connected to the ground wire through the second switch; and
    one end of the second sampling module is connected to the negative bus, and the other end of the second sampling module is connected to the ground wire through the fourth switch.

3. The control method according to claim 2, wherein the first sampling module comprises: a third resistor and a fifth resistor; and the second sampling module comprises: a fourth resistor and a sixth resistor,
    wherein one end of the third resistor is connected to the positive bus, the other end of the third resistor is connected to one end of the fifth resistor, the other end of the fifth resistor is connected to the ground wire through the third switch, and a connection node between the third resistor and the fifth resistor forms a first voltage sampling point; and
    one end of the fourth resistor is connected to the negative bus, the other end of the fourth resistor is connected to one end of the sixth resistor, the other end of the sixth resistor is connected to the ground wire through the fourth switch, and a connection node between the fourth resistor and the sixth resistor forms the second voltage sampling point.

4. The control method according to claim 1, wherein the voltage withstand module comprises: a controllable switch disposed on the ground wire.

5. The control method according to claim 1, wherein the determining whether the ground wire is connected based on a change in the voltage value of the second sampling voltage over a period of time specifically comprises:
    obtaining a time that has elapsed from the time at which the voltage withstand module enables the ground wire to be connected to the ground to the time at which the second sampling voltage reaches a steady state; and determining whether the elapsed time meets a preset time threshold, and if the elapsed time meets the preset time threshold, determining that the ground wire is connected.

6. The control method according to claim 1, wherein before controlling the voltage withstand module to enable the ground wire to be connected to the ground, the method further comprises:

enabling the first sampling module and a first resistor of the insulation sampling circuit to be connected between a positive bus and a ground wire, and enabling the second sampling module and a second resistor to be connected between a negative bus and the ground wire;

obtaining a voltage signal formed by the first sampling module or the second sampling module; and determining whether there is a fault in the first sampling circuit and the second sampling circuit based on the voltage signal, and if there is a fault, outputting fault information, and if there is no fault, controlling the voltage withstand module to be connected to the ground wire, controlling a first switch module to disconnect the first resistor from between the positive bus and the ground wire, and controlling a second switch module to disconnect the second resistor from between the negative bus and the ground wire.

7. The control method according to claim 6, wherein the determining whether there is a fault in the first sampling circuit and the second sampling circuit based on the voltage signal specifically comprises:

calculating a theoretical voltage difference between the positive bus and the negative bus based on the voltage signal;

calculating a difference between the theoretical voltage difference and an actual voltage difference between the positive bus and the negative bus; and determining whether a ratio of an absolute value of the difference between the theoretical voltage difference and the actual voltage difference to the actual voltage difference is less than a preset difference threshold, and if the ratio is less than the preset difference threshold, determining that there is no fault in the first sampling circuit and the second sampling circuit, and if the ratio is not less than the preset difference threshold, determining that there is a fault in the first sampling circuit and the second sampling circuit.

8. The control method according to claim 1, wherein the performing an insulation test when the ground wire is connected specifically comprises:

obtaining a first sampling voltage formed by the first sampling module and a second sampling voltage formed by the second sampling module, respectively;

controlling the first resistor to be connected between the positive bus and the ground wire when the first sampling voltage is greater than or equal to the second sampling voltage;

obtaining a third sampling voltage formed by the first sampling module and a fourth sampling voltage formed by the second sampling module after the first resistor is connected;

calculating a first insulation resistance between the positive bus and the ground wire and a second insulation resistance between the negative bus and the ground wire based on the first sampling voltage, the second sampling voltage, the third sampling voltage, and the fourth sampling voltage;

controlling the second resistor to be connected between the negative bus and the ground wire when the first sampling voltage is less than the second sampling voltage;

obtaining a fifth sampling voltage formed by the first sampling module and a sixth sampling voltage formed by the second sampling module after the second resistor is connected; and calculating a first insulation resistance between the positive bus and the ground wire and a second insulation resistance between the negative bus and the ground wire based on the first sampling voltage, the second sampling voltage, the fifth sampling voltage, and the sixth sampling voltage.

9. A battery management system, comprising: a processor and a memory, wherein the memory stores computer program instructions that, when called by the processor, cause the processor to perform the control method according to claim 1.

10. A power consuming device, comprising: the insulation sampling circuit, a battery, a load, and the battery management system according to claim 9, wherein the battery is connected to the battery management system and supplies power to the load.

11. A computer storage medium storing computer program instructions, wherein the computer program instructions, when called by a processor, cause the processor to perform the control method according to claim 1.

12. A control apparatus for an insulation sampling circuit, wherein:

the insulation sampling circuit comprises:

a first sampling circuit, comprising: a first sampling module, a first resistor, and a first switch module, wherein:

the first resistor is connected in parallel to the first sampling module, and the first switch module is configured to control the first sampling module and/or the first resistor to be connected between a positive bus and a ground wire;

a second sampling circuit, comprising: a second sampling module, a second resistor, and a second switch module, wherein:

the second resistor is connected in parallel to the second sampling module, and the second switch module is configured to control the second sampling module and/or the second resistor to be connected between a negative bus and a ground wire; and a voltage withstand module disposed on the ground wire and capable of controlling switching between a state where a ground wire is disconnected from the ground and a state where a ground wire is connected to the ground;

wherein:

the first sampling module performs voltage-dividing at both ends and provides a first voltage sampling point, and the first sampling circuit detects a voltage at the first voltage sampling point; and the second sampling module performs voltage-dividing at both ends and provides a second voltage sampling point, and the second sampling circuit detects a voltage at the second voltage sampling point; and the control apparatus comprises:
- a switch control unit configured to perform a first control: control the voltage withstand module of the insulation sampling circuit to enable the ground wire to be connected to the ground, control the first switch module of the insulation sampling circuit to enable a first sampling module to be connected between a positive bus and the ground wire, and control the second switch module to enable the second sampling module to be connected between a negative bus and the ground wire;
- a ground wire detection unit configured to: obtain a second sampling voltage formed at the second sampling module in a state where the first control has been performed, and determine whether the ground wire is connected based on a change in the voltage value of the second sampling voltage over a period of time;
- an insulation test unit configured to perform an insulation test when the ground wire is connected; and
- a fault reporting unit configured to output fault information when the ground wire is disconnected from the ground.

13. A voltage withstand test method, applied to an insulation sampling circuit, wherein:
the insulation sampling circuit comprises:
- a first sampling circuit, comprising: a first sampling module, a first resistor, and a first switch module, wherein:
  - the first resistor is connected in parallel to the first sampling module, and the first switch module is configured to control the first sampling module and/or the first resistor to be connected between a positive bus and a ground wire;
- a second sampling circuit, comprising: a second sampling module, a second resistor, and a second switch module, wherein:
  - the second resistor is connected in parallel to the second sampling module, and the second switch module is configured to control the second sampling module and/or the second resistor to be connected between a negative bus and a ground wire; and
- a voltage withstand module disposed on the ground wire and capable of controlling switching between a state where a ground wire is disconnected from the ground and a state where a ground wire is connected to the ground;

wherein:
- the first sampling module performs voltage-dividing at both ends and provides a first voltage sampling point, and the first sampling circuit detects a voltage at the first voltage sampling point; and
- the second sampling module performs voltage-dividing at both ends and provides a second voltage sampling point, and the second sampling circuit detects a voltage at the second voltage sampling point; and the voltage withstand test method comprises:
- applying a preset voltage between a positive bus and a ground wire that are connected to the insulation sampling circuit, and applying a preset voltage between a negative bus and the ground wire that are connected to the insulation sampling circuit;
- wherein the voltage withstand module of the insulation sampling circuit keeps the ground wire disconnected.

* * * * *